United States Patent [19]
Takahashi et al.

[11] Patent Number: 5,583,694
[45] Date of Patent: Dec. 10, 1996

[54] OPTICAL ELEMENT AND OPTICAL AXIS DISPLACEMENT DEVICE USING THE SAME

[75] Inventors: Yukio Takahashi, Kodaira; Tomoyoshi Nomura, Tokyo; Takayuki Okimura, Tokorozawa, all of Japan

[73] Assignee: Nippon Telegraph and Telephone Corporation, Tokyo, Japan

[21] Appl. No.: 91,005

[22] Filed: Jul. 13, 1993

[30] Foreign Application Priority Data

Jul. 14, 1992 [JP] Japan .................................. 4-186440
Aug. 27, 1992 [JP] Japan .................................. 4-228448
Oct. 23, 1992 [JP] Japan .................................. 4-286373

[51] Int. Cl.$^6$ .................................................. G02B 27/64
[52] U.S. Cl. ........................... 359/557; 359/196; 359/896
[58] Field of Search .................................. 359/196, 201, 359/209, 298, 557, 896; 356/149; 362/326, 331

[56] References Cited

U.S. PATENT DOCUMENTS

| | | | |
|---|---|---|---|
| 3,212,420 | 10/1965 | De La Cierva | 359/196 |
| 3,438,700 | 4/1969 | Gillard | 359/196 |
| 3,514,192 | 5/1970 | De La Cierva | 359/557 |
| 5,168,385 | 12/1992 | Kobayashi et al. | 359/209 |

FOREIGN PATENT DOCUMENTS 64-35479   2/1989   Japan .
2-281287  11/1990  Japan .

*Primary Examiner*—Paul M. Dzierzynski
*Assistant Examiner*—Darren E. Schuberg
*Attorney, Agent, or Firm*—Finnegan, Henderson, Farabow, Garrett & Dunner, L.L.P.

[57] ABSTRACT

The present invention relates to a light ray shift element which provides controlled refraction of the incident ray and an optical axis displacement device using the above light ray shift element. An application of these optical devices to an interleave projection display system is demonstrated. The optical element is constructed from transparent flat plate materials containing a first optical medium and are disposed at a predetermined spacing along the optical axis. The orientation angle of the transparent flat plates with respect to the optical axis can be varied independently. A bulkhead consisting of the transparent flat plates and a second optical medium having an index of refraction different from the first optical medium, which is enclosed in a hermetic extendable seal, is utilized to provide light ray shift and optical axis displacement. By selecting the first and second optical media suitably, the angle of refraction of the incident ray can be controlled to optimize the quality of the image generated by the interleave projection system.

5 Claims, 33 Drawing Sheets

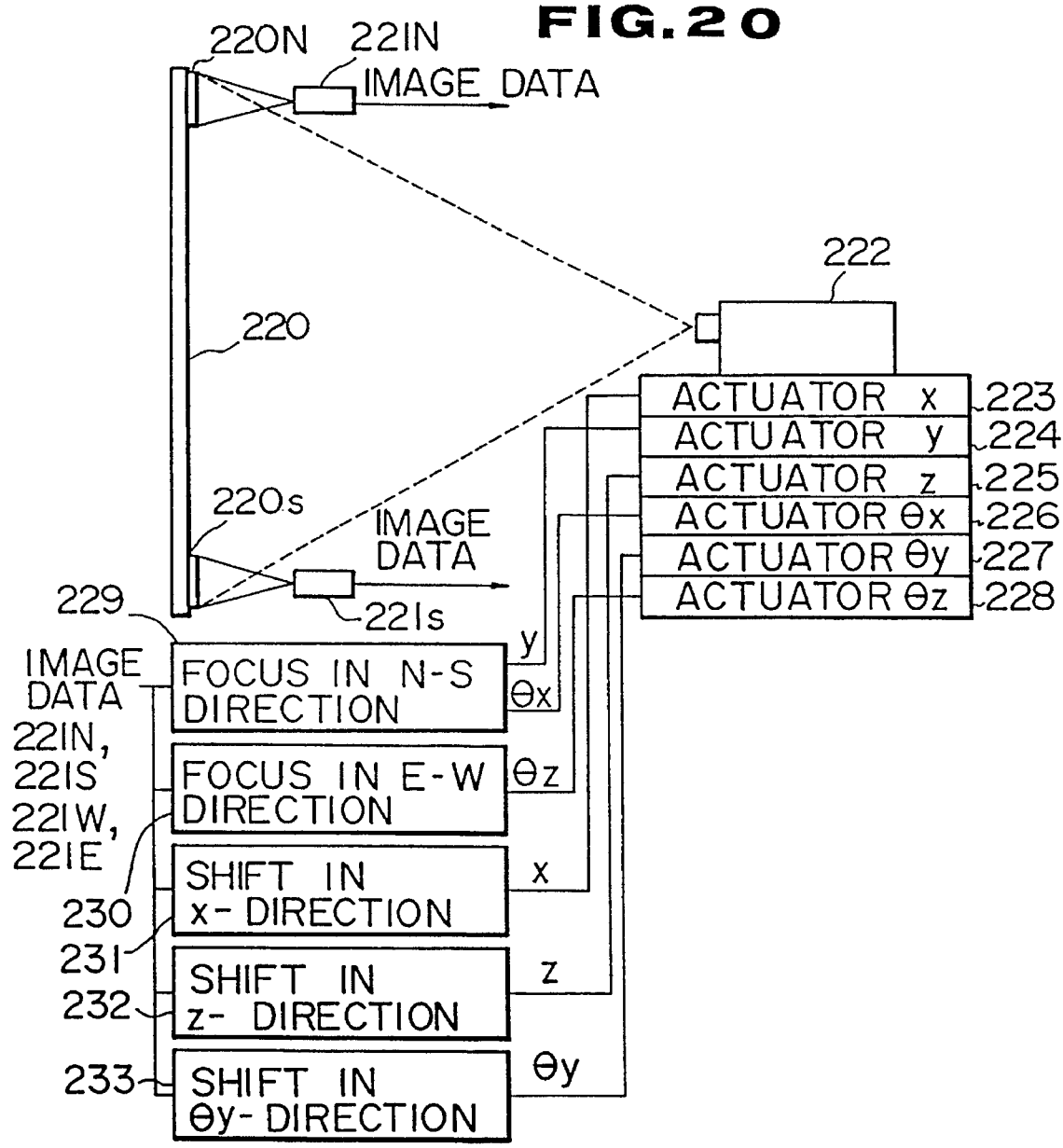

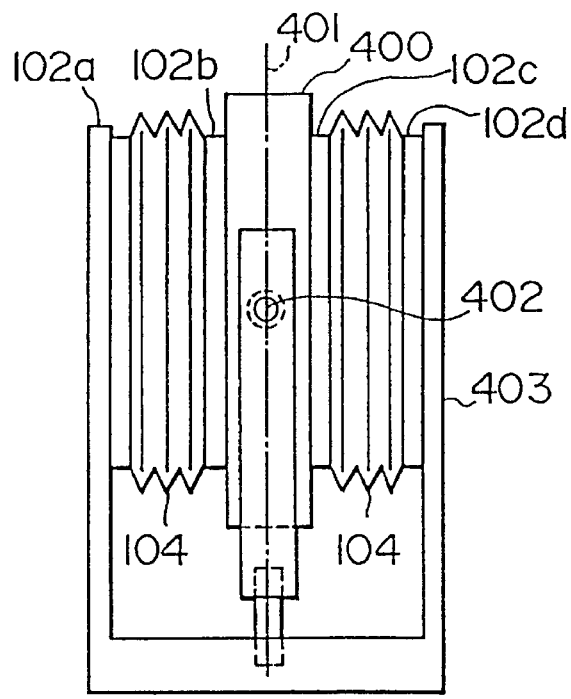
FIG. 24 (a)
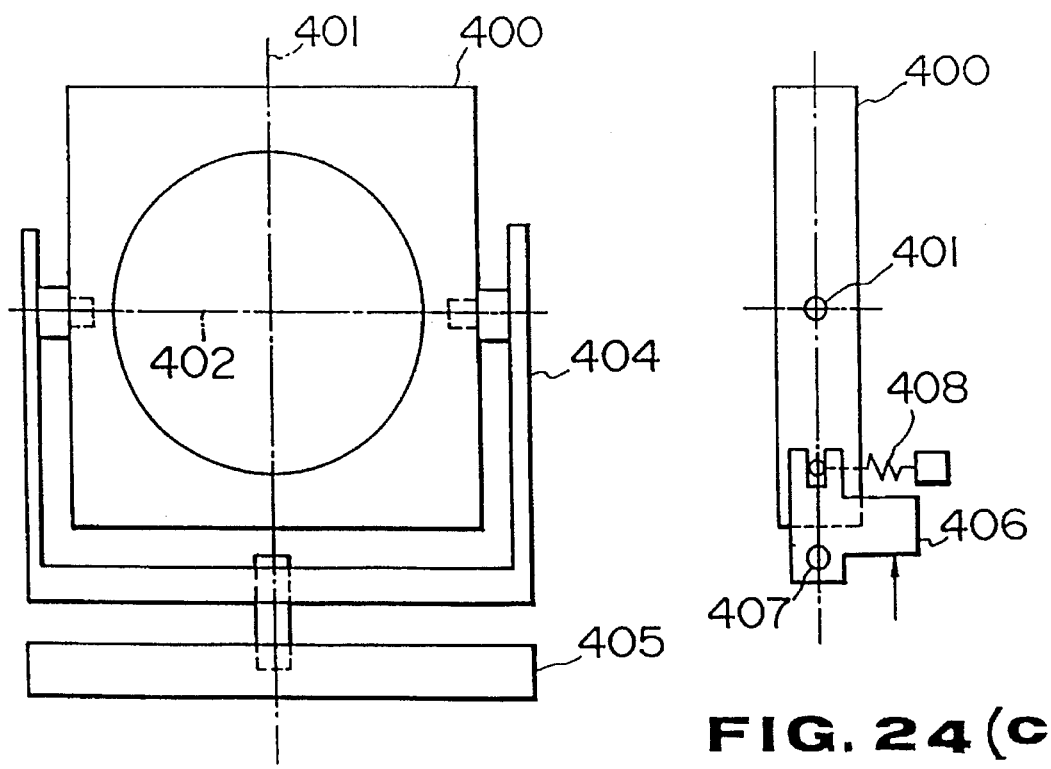
FIG. 24 (b)
FIG. 24 (c)

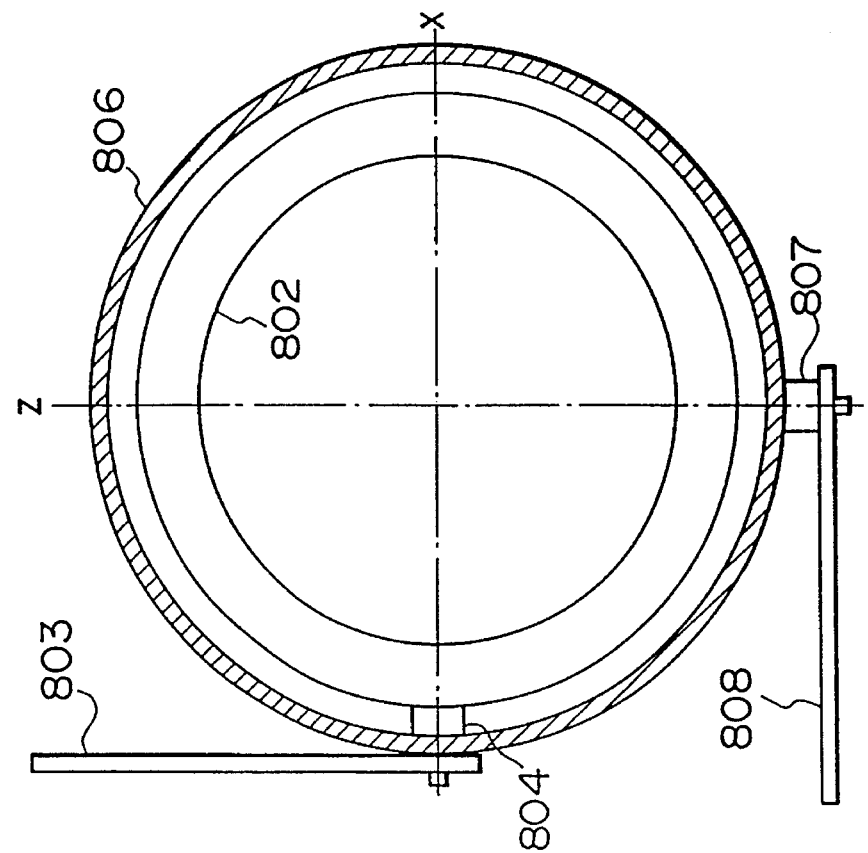
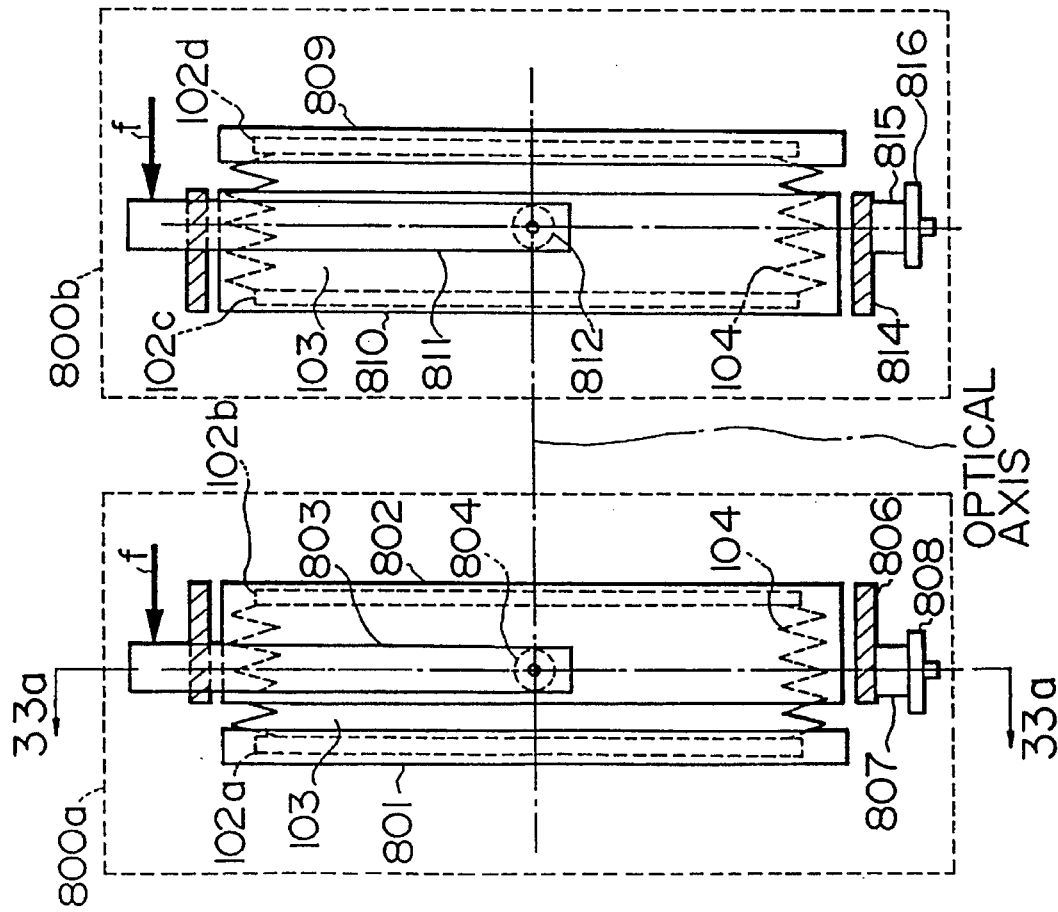

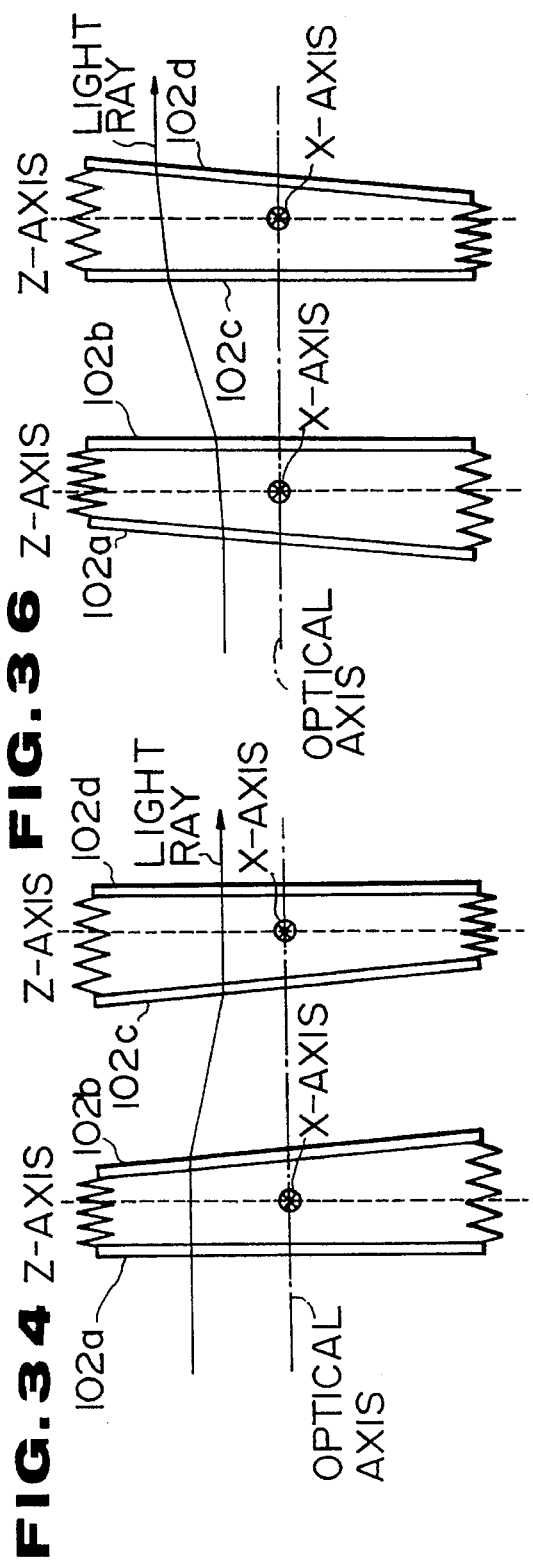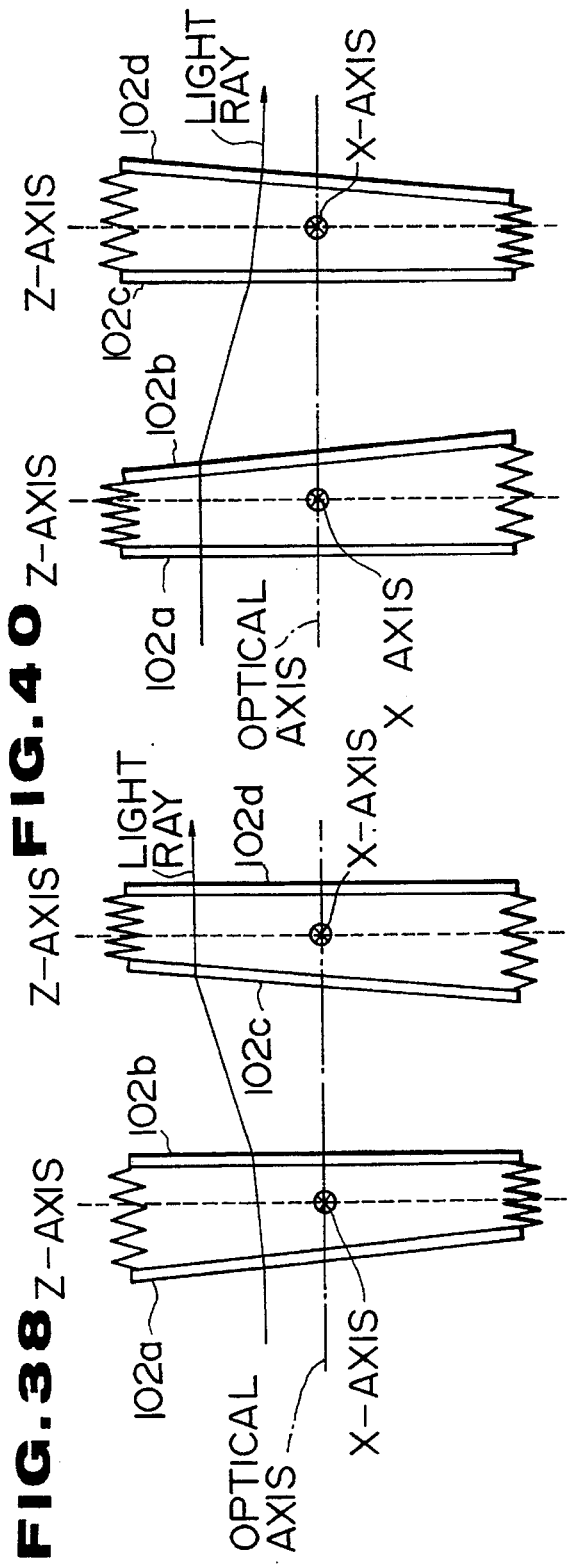

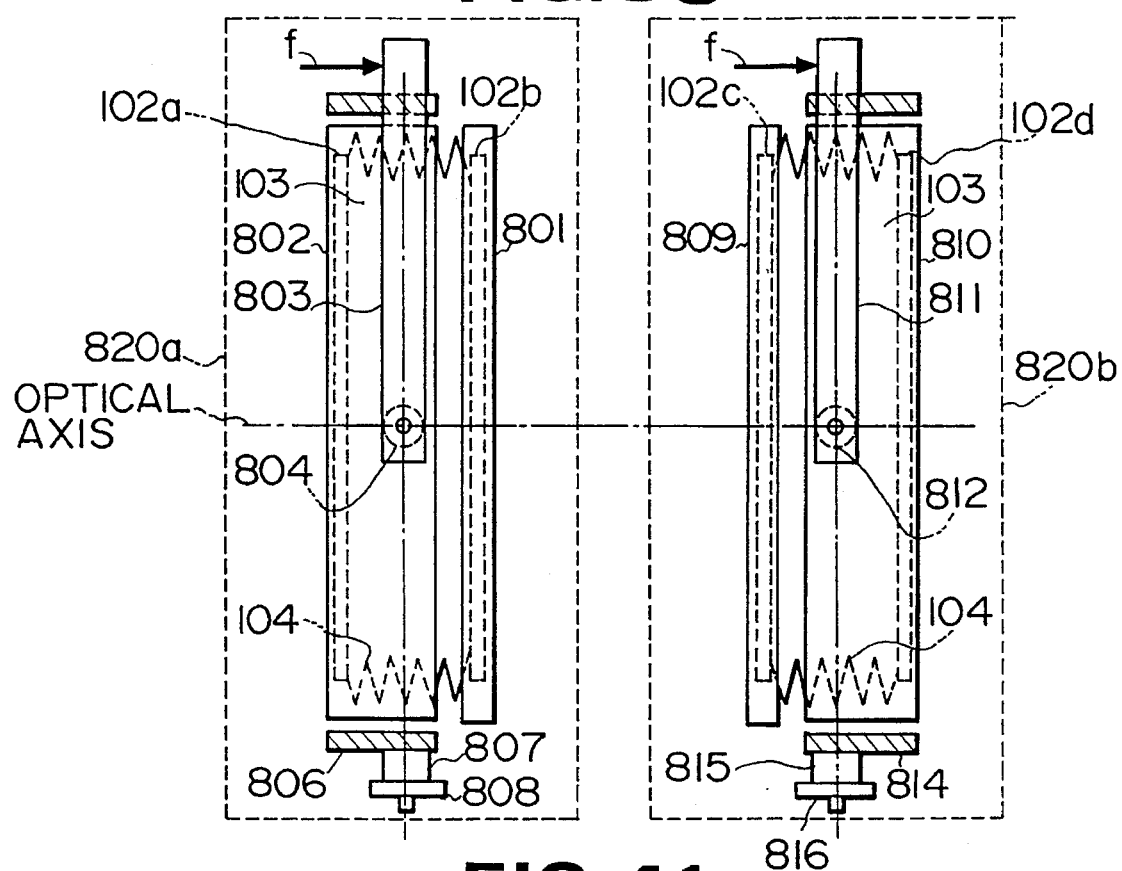
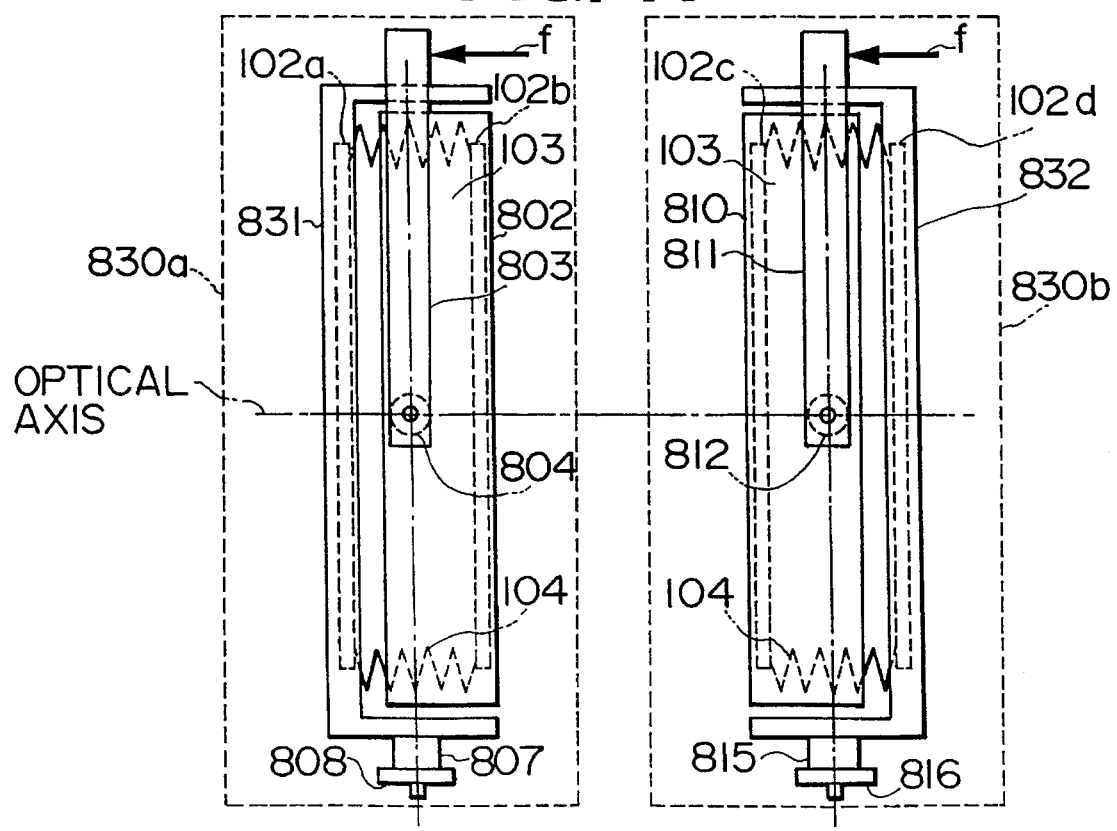

OPTICAL ELEMENT AND OPTICAL AXIS DISPLACEMENT DEVICE USING THE SAME

BACKGROUND OF THE INVENTION

1. Field of Invention

The present invention relates to a light ray refraction element and an optical axis displacement device, and a projection display apparatus based on the light ray refraction element.

2. Technological Background

In recent years, there have been active developments of projection display devices which enlarge and display images on a light valve by means of an optical projection system. Especially, the use of transparent, active matrix liquid crystal display panels (referred to as TFT.LCD hereinbelow) as the light valve component in projection display devices (shortened to projectors hereinbelow) is gaining attention. This is because such panels provide excellent color reproduction and contrast, and provide simple apparatus for creating large screen images of impressive scale. The development of liquid crystal projector for high definition television (HDTV) applications has already been realized.

A conventional type of projector is schematically illustrated in FIG. 48. In this figure, the reference numeral 1 refers to a light source, 2 is a filter for filtering the infrared (IR) and ultraviolet (UV) components for the light generated from the light source 1, 3 is an optical filter, 4 is a condensor lens to condense the ray from the light source 1, 5 is a light valve, 6 is a projection lens and 7 is a screen.

Such a projector displays images, produced in the light valve 5 using the regular LCTV technique, on the screen 7 through the projection lens 6. In this system, the light valve 5 itself is not luminescent, and the image on the light valve 5 is illuminated from the back with the light source 1 and is enlarge by the projection lens 6.

To achieve higher image resolution with the above optical configuration, it is necessary to have a quantum increase in the density of pixels on the TFT.LCD so as to accommodate the huge increase in the screen display area. This approach requires that the bus line resistance in the LCD circuit be lowered, the density of pixels be increased and the TFT driving capability be improved; however, these requirements are difficult to be met in production, and the manufacturing yield suffers as a result. Further, LCD circuits of such a complexity demand higher circuit performance, such as faster driving LSI and other components. For this reason, the conventional approach to improving the image resolution has been to utilize a number of projectors to project several images of one image from different projectors so as to compensate for the vacant spaces between the pixels from different projectors. Examples are disclosed in a Japanese Patent Application, First Publication, S64-35479 and a Japanese Patent Application, First Publication, H2-281287.

An example of such a multi-projector system is shown in FIG. 49. In this figure, the reference numerals 11, 12 refer to light sources, 21, 22 are IR and UV filters respectively, 31, 32 are optical filters, 41, 42 are condensor lens, 51, 52 are light valves, 61, 62 are projection lenses, 7 is a screen, m1, m2 are optical axes of the projection lenses (i.e., projectors).

As illustrated in FIG. 49, the images on the light valve 51, 52 are interleaved on the screen 7 to form a composite image. The mechanism of such an interleaving projection system will be explained with reference to FIG. 50.

FIG. 50 illustrates a case of interleaving four component images (A, B, C and D) to produce a composite image E. The images A, B, C and D are formed on TFT.LCDs which constitute four individual light valves. A component image is formed by numerous pixels such as those shown by the four shapes in this figure, and a pixel consists of a light aperture portion for transmission of light and a light shield portion. It follows that by projecting a composite image by shifting a half pixel for each interleaved image such that each light aperture portion of one image overlaps with the light shield portion of the other images, it becomes possible to achieve a precision projection display which is twice the size of the original image.

To successfully project a high-resolution composite image by such a interleaving technique, it is necessary that every opening section of every pixel in the entire image align precisely with every light shield portion of all other pixels of the other images. This means that not only condensing of the images but other optical factors of the pixels such as the size, distortion and the rotational direction on the screen, should be identical for all the pixels. This means that the system requires adjustments in the direction of six axes, x, y z, θx, θy, and θz, for each optical axis of a projector, as illustrated in FIG. 51.

In the conventional system, such adjustments are made with a precision optical stage for R & D, and such a stage had to be large and sturdy so as to accommodate a projector weighing several tens of kilograms, thus resulting in an extremely heavy stage.

Furthermore, since the stage is heavy, adjusting mechanisms such as stepping motors for driving the stage had to be correspondingly powerful, thus resulting in a giant overall projection system.

SUMMARY OF THE INVENTION

The present invention was made in view of the technical background presented above, and the primary subject is to present an optical element which enables to refract the optical axis of the incident ray precisely and easily, and to present application examples of the optical elements to interleave projection display device.

An optical element especially for use in a multi-projector display system comprises: a plurality of transparent flat plates disposed at a predetermined spacing along an optical axis of a light ray passing through a first optical medium, wherein the orientation of the incident ray surface of each of said transparent flat plates is freely adjustable with respect to said optical axis; a freely extendably bulkhead enclosing said plurality of transparent flat plates so as to provide a hermetic space between said transparent flat plates; and a second optical medium filling said hermetic space of a different index of refraction from said first optical medium.

To simplify the explanation, suppose the ray entry surface of the transparent flat plate is at right angles to the optical axis, the incident ray entering the first optical medium enters the incident ray surface of the transparent flat plate, then enters the second optical medium, and exits from the transparent flat plate on the exit ray surface. Because the incident ray is orthogonal to the incident ray surface of the flat plate, the ray axis of the incident ray until it passes through the second optical medium coincides with the optical axis. When the incident ray exiting from the second optical medium enters the next transparent flat plate, the indexes of refraction of the two media are different, the incident ray enters the next transparent flat plate at, for example, an angle θ1 (incident angle), and exits from the next flat plate at an angle θ2 (refracted angle). Thus the incident ray is refracted.

In general, if the index of refraction of the first optical medium is n1, and the index of refraction of the second optical medium is n2, the angles of refraction of θ1 and θ2 are related by the following equation.

$$\sin \theta_1 / \sin \theta_2 = n_2/n_1 = n_{12}$$

where n12 is an index of refraction of the second optical medium relative to the first optical medium. Therefore, by judiciously selecting the two optical media, it is possible to optimize the refraction angle to suit any application.

Thus, the optical element of the present invention enable to achieve precision control over the refraction angles of the incident light ray.

Further aspect of the present invention relates to a plurality of optical elements disposed along the optical axis.

For brevity, a case of disposing two optical elements will be considered. An incident ray entering one optical element is refracted by the one optical element and enters another optical element where it is again refracted.

In the optical axis displacement device of the above construction, by selecting the first optical medium and the first and second optical elements suitably, the refraction angles of the one and another optical elements can be varied appropriately. Therefore, by adjusting the angle of the incident ray, the incident ray can undergo parallel shift displacement or refraction of a selected degree.

According to the optical axis displacement device of such a configuration, the incident light ray can be refracted or displace easily and precisely.

The projection display apparatus of the present invention provides interleave projection of a plurality of images on plurality of light valves which are enlarged and projected by a plurality of projectors as a composite image on a screen. The present invention relates to an application of disposing one or more combinations of the above optical element configurations in front (ray entry side) or behind (ray exit side) the projection lens system of a plurality of interleave projection systems.

By disposing one or more combinations of the optical element configurations in front (ray entry side) or behind (ray exit side) the projection lens system of each projector, the optical axis can be displaced or the light ray to be shifted, thereby enabling to align the pixels from different projectors readily and precisely. Therefore, the present invention enables to increase the resolution of the projection system and improve the image quality, without increasing the pixel density of light valves or enlarging the light valve area.

According to the interleave projection system of the present invention, optical axis displacement or light ray shift can be accomplished by disposing one or more combinations of optical elements of the present invention in front (ray entry side) or behind (ray exit side) the projection lens system of each projector. Such an arrangement of the optical components enables to align the pixels from different projectors readily and precisely. Therefore, the interleave projection system of the present invention enables to increase the resolution of each of the projection system thereby improving the image quality, without increasing the pixel density of light valves or enlarging the light valve area.

The optical elements of the present invention can be applied to a different type of interleave projection system in which a projection display modular system comprising projectors without a projection lens system are used. Light rays from a plurality of such projection display modules are reflected from a plurality of reflection mirrors, and the reflected rays are projected into a single projection lens system, thereby generating a composite image from a plurality of images from a plurality of projection display modules. In such a configuration, one or more combination of the optical elements of the present invention can be placed between the plurality of mirrors and the plurality of projection display modules.

In this interleave projection display module system, optical axis displacement or light ray shift can be accomplished by disposing one or more combinations of optical elements of the present invention between the projection modules and the plurality of mirrors. Such an arrangement of the optical components enables to align the pixels from different projectors readily and precisely. Therefore, the interleave projection system of the present invention enables to increase the resolution of each of the projection system thereby improving the image quality, without increasing the pixel density of light valves or enlarging the light valve area.

BRIEF EXPLANATION OF THE DRAWINGS

FIG. 20 is a schematic representation of the process of the sixteenth embodiment of the projection display apparatus of the present invention.

FIGS. 24(a), 24(b) and 24(c) are schematic side, front and top views, respectively, of a nineteenth embodiment of the optical elements for the projection device of the present invention.

FIG. 32 is a schematic side view of optical axis displacement device of a twenty-third embodiment of the projection display apparatus of the present invention.

FIG. 33 is a cross sectional view of a plane along the line 33a—33a in FIG. 32.

FIG. 34 is a schematic side view to illustrate the operation of the optical axis displacement device of the twenty-third embodiment of the present invention.

FIG. 35 is a schematic side view to illustrate the optical axis displacement device of the twenty-fourth embodiment of the present invention.

FIG. 36 is a schematic side view to illustrate the operation of the optical axis displacement device of the twenty-fourth embodiment of the present invention.

FIG. 38 is a schematic side view to illustrate the operation of the optical axis displacement device of the twenty-fifth embodiment of the present invention.

FIG. 40 is a schematic side view to illustrate the operation of the optical axis displacement device of the twenty-sixth embodiment of the present invention.

FIG. 41 is a schematic side view to illustrate the optical axis displacement device of the twenty-seventh embodiment of the present invention.

PREFERRED EMBODIMENTS OF THE INVENTION

Figure 51:
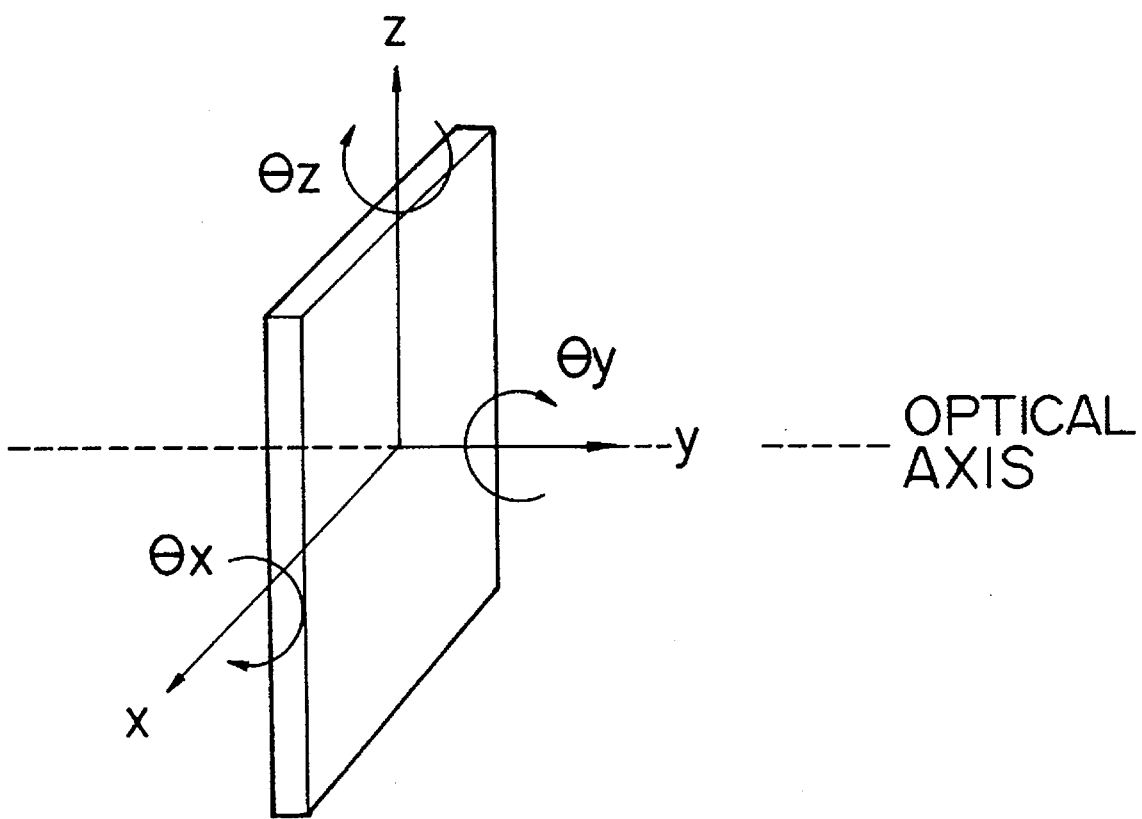
FIG. 51 is an illustration to explain the directions of image adjustment involved in precision interleave projection approach.

In the following, preferred embodiments of the invention will be explained with reference to the attached drawings. In the following descriptions of the various embodiments of the projection display apparatus, the directions are always referenced with respect to the six axes shown in FIG. 51. The axes x, z and y are linear adjustments. The x-axis represents left/right adjustments; the z-axis represents vertical adjustments; and the y-axis represents condensing adjustments. Tilting of the image is corrected by adjusting of the optical axis by rotation around the $\theta x$, $\theta y$ and $\theta z$ axes.

Embodiment 1

Figure 1:
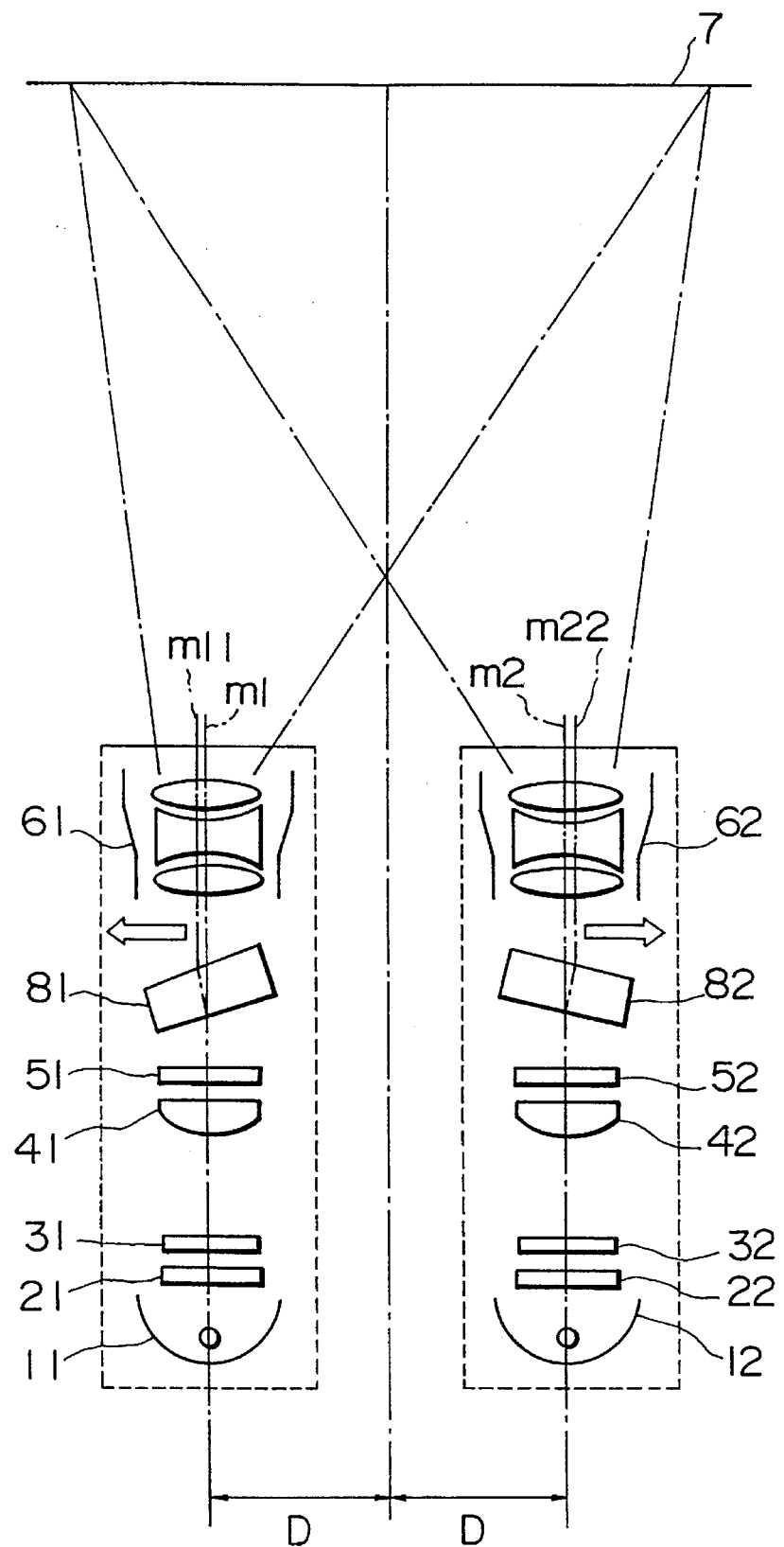
FIG. 1 is a schematic representation of a first embodiment of the projection display apparatus of the present invention.

FIG. 1 is a schematic representation of a first embodiment of the projection display apparatus. The first embodiment relates to a device for positioning the light ray in the x-axis direction of the screen, i.e. left/right adjustments with respect to the optical axis, and in the z-axis direction of the screen, i.e. up/down adjustments with respect to the optical axis. It should be noted that in FIG. 1, the up/down direction is perpendicular to the plane of the paper. Positioning is performed by an optical axis displacement device comprising a transparent flat plate material. The following explanation is given only for the x-axis direction, since the adjustment operations in the other axial direction are identical to those of the x-axis direction.

In FIG. 1, the reference numerals 11, 12 refer to light sources; 21, 22 are IR and UV filters for the light generated by the light source 11, 12; 41, 42 are condensor lenses; 51, 52 are light valves; 61, 62 are projection lenses; 81, 82 are transparent flat plate material disposed between the light valves 51, 52 and the projection lenses 61, 62; 7 is a screen and m1, m2 are optical axes for the projection lenses.

Figure 49:
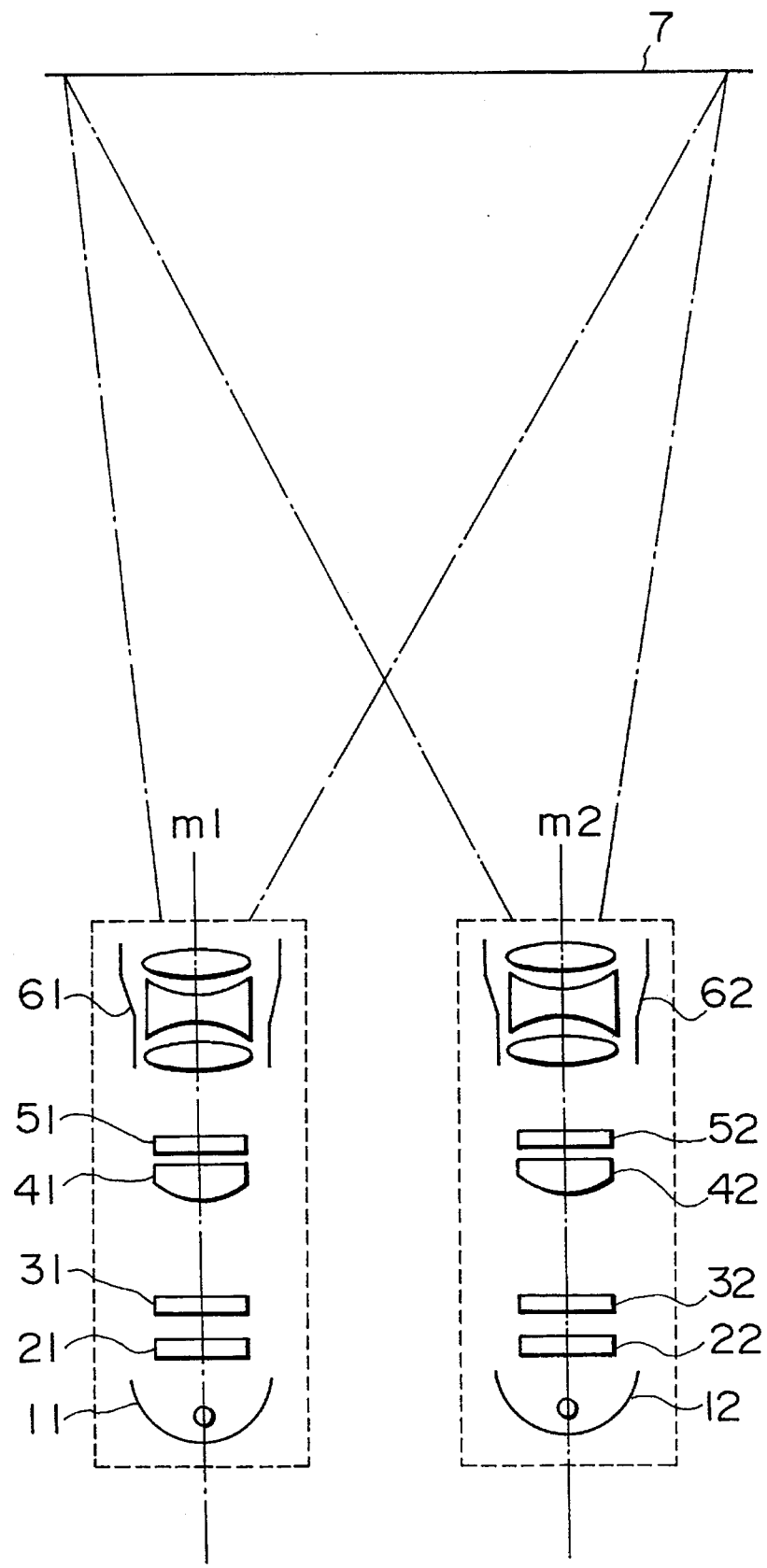
FIG. 49 shows conventional projection display system which is provided with an image interleaving capability.

Images of light valves 51, 52 enlarged through the lenses 61, 62 in accord with the same principle illustrated in FIG. 49 are formed on the screen 7. The transparent flat plate (shortened to flat plates hereinbelow) 81, 82 rotate about the z-axis, in opposite directions with respect to each optical axis m1, m2. Therefore, when the flat plate 81, 82 are disposed in the ray path, the ray exiting the light valves 51, 52 are refracted and displaced in the respective directions shown by the arrows in FIG. 1. Therefore, the centers of the light valves 51, 52 are respectively displaced upon exit to exit optical axes m11, m22. The images from the light valves 51, 52 formed on the screen 7 are displaced respectively in the opposite directions to the arrows in accordance with the image formation principles of projection lenses 61, 62 (acting as concave lens). The image displaced distance of the images formed on the screen 7 is S times the value according to the image formation principle (projection enlargement), where S is the amount of displacement between the incident optical axis m1, m2 and the exit optical axes m11, m22.

Embodiment 2

Figure 2:
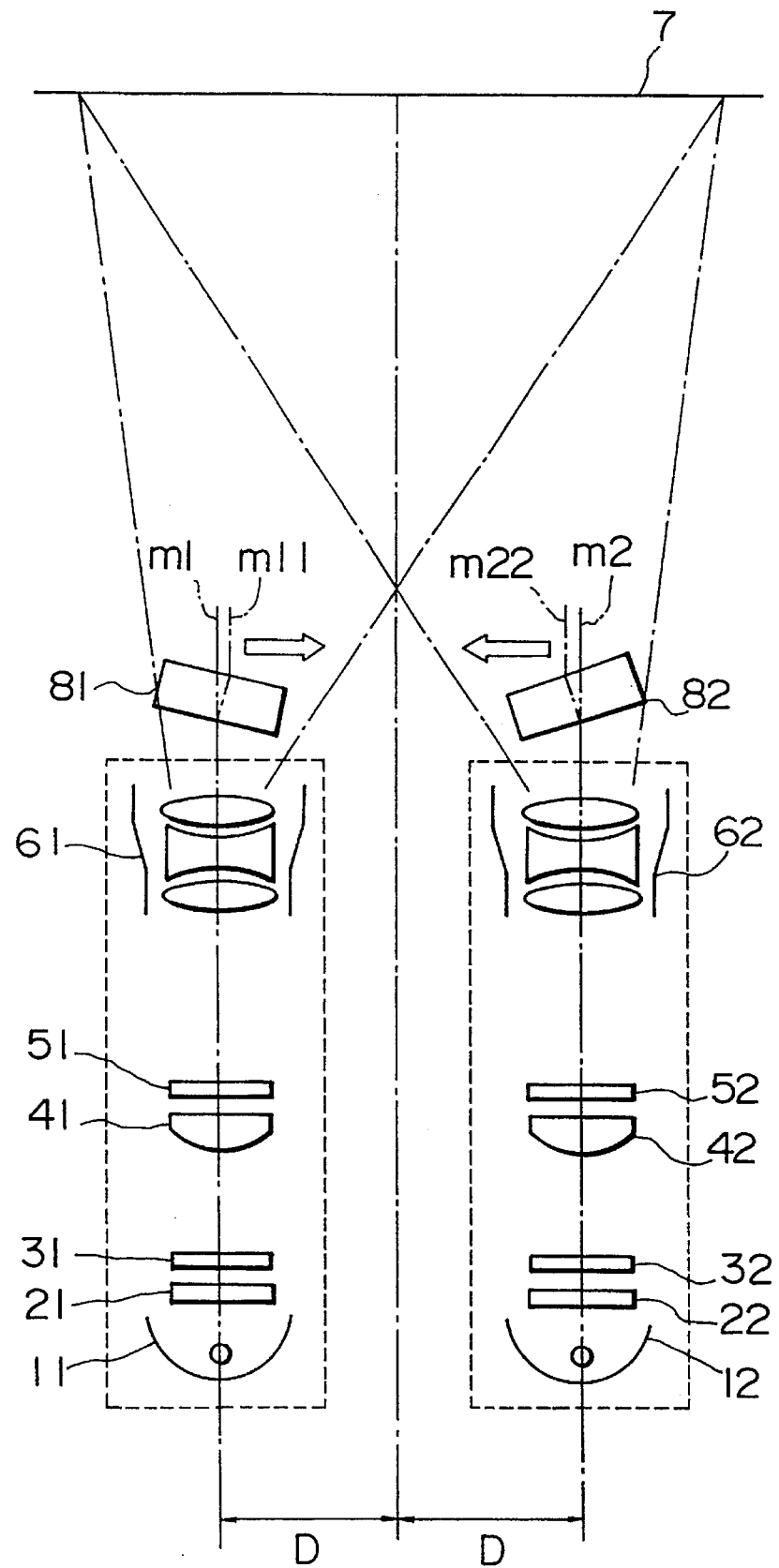
FIG. 2 is a schematic representation of a second embodiment of the projection display apparatus of the present invention.

FIG. 2 is a schematic representation of a second embodiment of the projection display apparatus. As in the first embodiment, the device shown in FIG. 2 also displaces the light ray in the x- and z-axes direction, and a transparent flat plate material (flat plate) was used as the light ray an optical axis displacement device. The following explanation is provided only for the case of positioning in the x-axis direction.

Each of the flat plate 81, 82 is disposed in front of the projection lenses 61, 62, and is rotated around the z-axis in the opposite direction to each other with respect to the optical axes m1, m2. Except for the difference in the positioning of the flat plate 81, 82, the configuration of the second embodiment is the same as that in the first embodiment. In the configuration shown in FIG. 2, the light rays from the condensor lenses 61, 62 are displaced respectively to exit optical axes m11, m12. The amount S of the ray displacement is governed only by the amount of refraction given by flat plates 81, 82.

Embodiment 3

Figure 3:
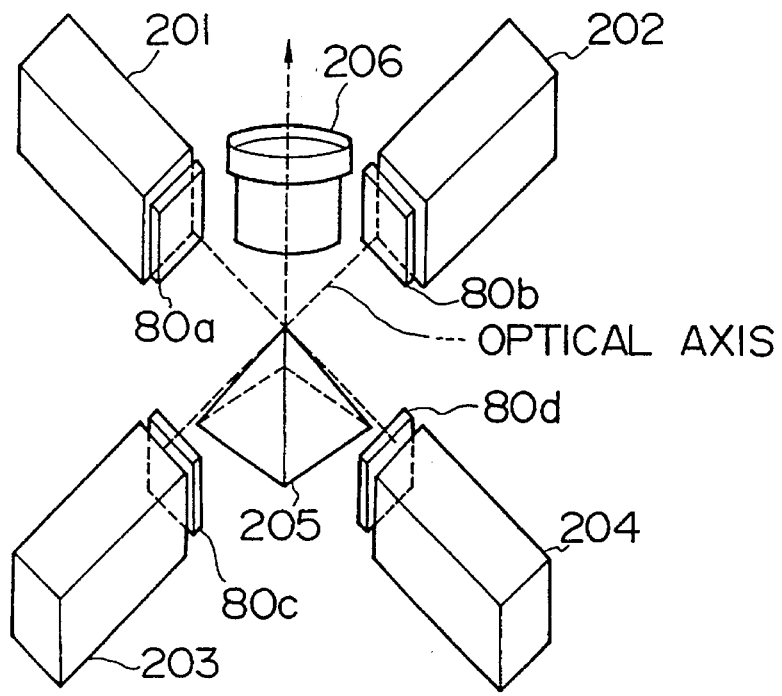
FIG. 3 is a schematic representation of a third embodiment of the projection display apparatus of the present invention.

FIG. 3 shows a third embodiment of the projection display apparatus of the present invention. This embodiment relates to an application of the positioning device to a projection display apparatus which is not provided with projection lens. The composite image is produced by utilizing reflection mirrors to reflect the images produced by four display modules and a single projection lens so as to interleave a number of light rays on the screen. In this figure, a case of using four display modules is discussed to simplify the explanation.

in FIG. 3, the reference numerals 201, 202, 203 and 204 refer to modular display devices with the condensor lens 6 removed, and are disposed 90 degrees apart; 205 is a pyramidal-shaped polyhedron whose all four surfaces are made of total reflection mirrors. Optical axis displacement element 80a, 80b, 80c and 80d are disposed between the mirror 205 and the respective modules 201, 202, 203 and 204.

The operation of the optical axis displacement element will be presented later.

Figure 4:
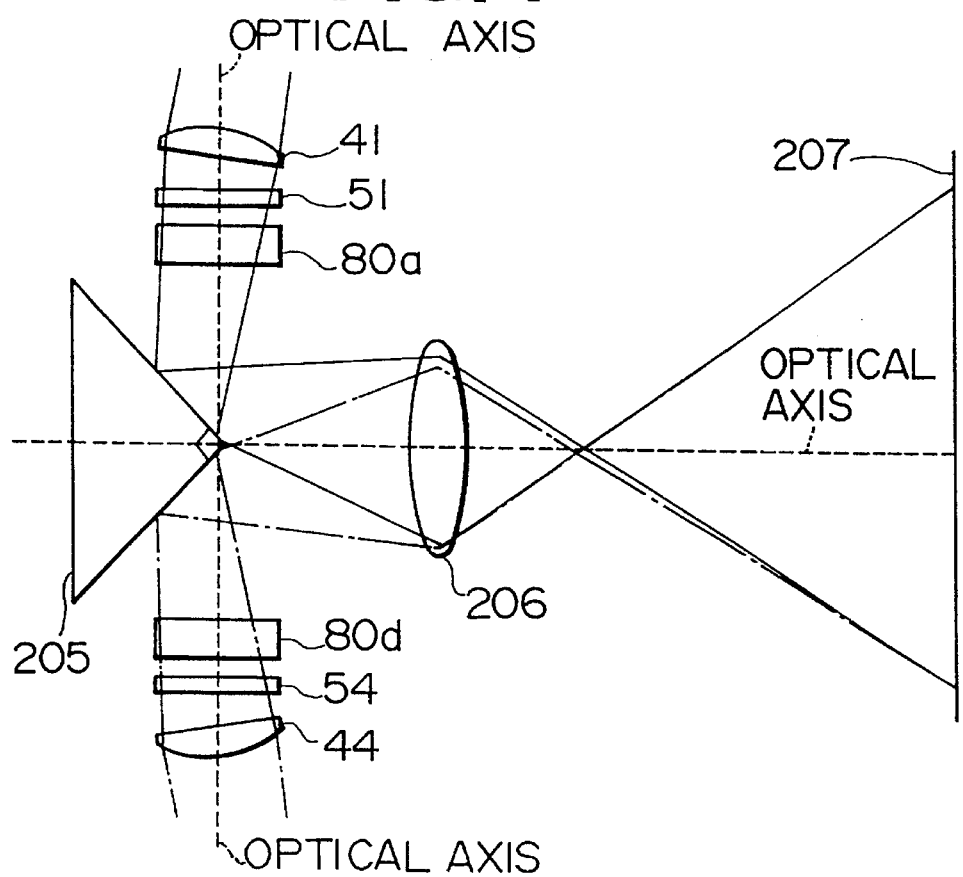
FIG. 4 illustrates the principle of interleave projection display apparatus in the first, second and third embodiments.

FIG. 4 is a schematic illustration of the principle of interleave projection, and represents a side view of the arrangement shown in FIG. 3. The axis of the mirror 205 is disposed at right angles to the optical axis of the projection lens 206, intersecting with the optical axes of the projection lens 206 at the apex of the mirror 205. The light valves 51, 52, 53 and 54 in each of the modules are disposed on the optical axes of the modules so as to interleave the images on the screen 207.

Figure 5:
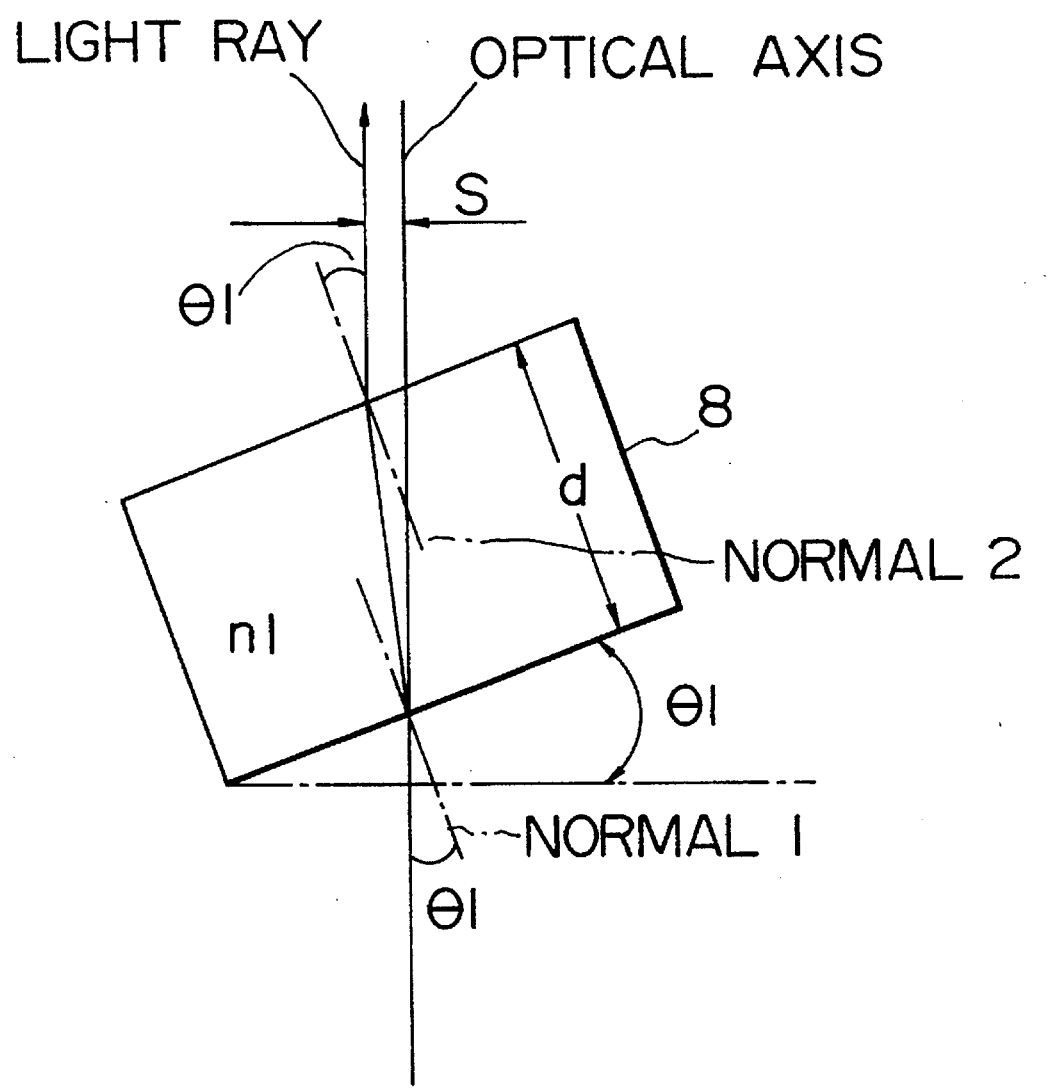
FIG. 5 is a schematic illustration of the optical paths of a transparent flat plate material used in the first, second and third embodiments.

FIG. 5 illustrates in detail the light ray paths through the flat plate used as the an optical axis displacement device in the previously presented embodiments. The reference numeral 8 refers to a transparent flat plate material (shortened to flat plate), and is inclined to the optical axis at an angle θ1. The flat plate 8 has a thickness d and the index of refraction n1. In the following explanation, the angles are taken in a paraxial region in which an approximation Sin θ≈θ holds true.

The light ray incident on the flat plate 8 along the optical axis enters the flat plate at an angle θ1 with respect to the normal 1, and refracts at the flat plate. The refracted ray exits the flat plate 8 in the same direction as the incident ray when the incident ray surface and the ray exit surface ar parallel, but the position of the exit ray is displaced by an amount S. The amount of displacement S is given by the law of refraction as follows.

$$S=(d \times \theta 1 \times (n1-1))/n1 \qquad \text{Eqn 1}$$

Therefore, when the flat plate 8 is rotated around the x- and z-axes, the light ray can be displaced at both x- and z-axes.

Embodiment 4

Figure 6:
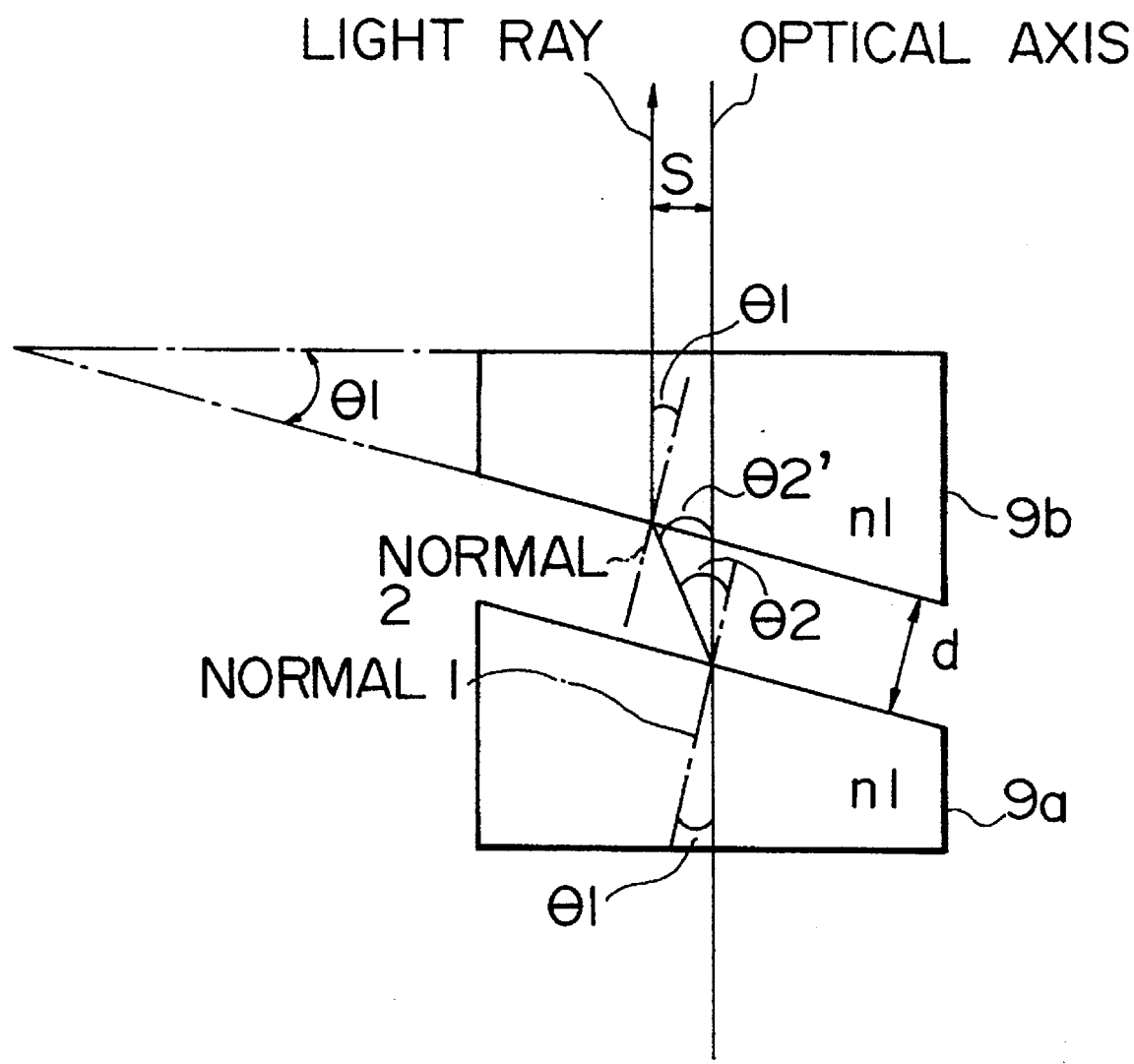
FIG. 6 is a schematic representation of a fourth embodiment related to transparent wedge material of the projection display apparatus of the present invention.

FIG. 6 is a schematic representation of a fourth embodiment of the optical axis displacement device. The fourth embodiment relates to a device for adjusting the light ray, as in the first three embodiments, in the x- and z-axes directions. This embodiment utilizes two transparent material of a wedge type for the optical axis displacement element, in which one of the surface is inclined with respect to the other surface. The explanation is given on for the case of adjusting in the x-axis direction, and the optical configuration is identical to those shown in the previous embodiments, and its explanation is omitted.

In FIG. 6, the reference numerals 9a, 9b refer to a wedge type transparent material (shortened to wedge), and they are arranged so that the inclined surfaces of each wedge are parallel as shown in this figure with an intervening air gap of a distance d. The angle of inclination is the same for each wedge, and is set at θ1. If the planar incident ray surface and the planar ray exit surface of each wedge 9a, 9b are perpendicular to the optical axis, and a light ray enters the wedge 9a parallel to the optical axis, the light ray strikes the inclined surface of the wedge 9a at the angle θ1, and is refracted at an angle θ2 upon entering the air medium. The refracted ray enters the wedge 9b and is refracted at the angle θ1, as the two inclined surfaces of each wedge are parallel. In the end, the light ray exiting the wedge 9b is parallel to the incident ray entering the wedge 9a but is displaced by a distance S from the optical axis. The distance S is given by, in accordance with the law of refraction by the following Equation 2.

$$S = d \times \theta_1 \times (n_1 - n) \qquad \text{Eqn 2}$$

It follows that by arranging the wedges 9a, 9b at a variable distance and rotating each wedge 9a, 9b around the y-axis, the exit ray axis can be displaced with respect to both the x- and the z-axes.

Embodiment 5

Figure 7:
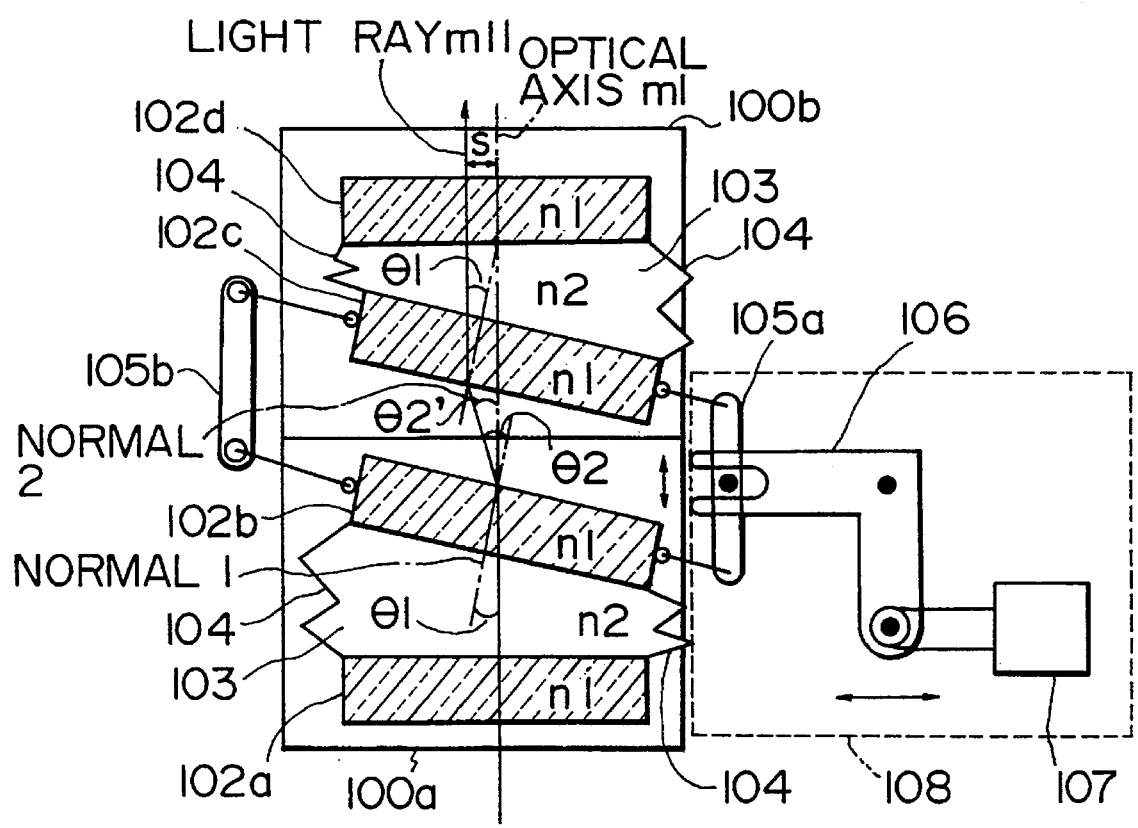
FIG. 7 is a schematic representation of an optical axis displacement device used in the fifth embodiment of the projection display apparatus of the present invention.

FIG. 7 is a schematic representation of a fifth embodiment of the optical axis displacement device of the present invention. The fifth embodiment relates to a displacement device made of a pair of optical elements used in the first, second and third embodiments. In this embodiment, the angle of orientation of the light valves can be varied with respect to the optical axis of the projection lens, and adjusting can be done continuously at will with respect to both the x- and z-axes. The explanation is provided only for the x-axis direction for brevity. The arrangement of the optical system in this embodiment is the same as those shown in FIGS. 1, 2 and 3, and the explanation of the optical components is omitted.

The overall system is composed of an optical element 100a and an optical element 100b, having the same construction. The optical element 100a comprises a pair of flat plates 102a, 102b and a transparent liquid (second optical medium) 103, having the same index of refraction as the flat plates 102a, 102b, disposed therebetween. All the components are enclosed in a freely extendable sealing structure 104 (bulkhead), such as bellows. The optical element 100b comprises flat plates 102c, 102d and a transparent liquid 103 having the same index of refraction as the flat plates 102c, 102d. The transparent liquid 103 is sealed between the flat plates 102c, 102d with a sealing structure 104 in the same way as the optical element 100a.

As shown in FIG. 7, the optical elements 100a, 100b are assembled so that the opposing plane surfaces of the flat plates are parallel to each other and are separated with an air gap (first optical medium) of a distance d. Each flat plate 102a and 102b is disposed at an angle of θ1 with respect to the optical axis, and the flat plates 102a, 102d are disposed at right angle to the optical axis. The flat plates 102a, 102b are separated with a seal structure 104, and are therefore movable independently of each other. In other words, the flat plates 102b and 102c are joined with each other at the ends by means of a set of connecting bracket 105a, 105b which are moved vertically (in the plane of the paper) in FIG. 7 so as to adjust the angle θ1 while maintaining the mutual parallelism of the flat plates 102b, 102c. The optical effect of the fifth embodiment is the same as that for the third embodiment using a pair of transparent wedge material. That is, an incident ray entering the optical element 100a exits from the optical element 100b parallel with but displaced from the incident ray with a distance S. In the fifth embodiment, the angle θ1 with respect to the optical axis is adjusted by means of a driving device 108.

A driving device 108 comprises: a connecting bracket 105; driving arm 106; and a micrometer 107. When the micrometer 107 is operated to move the micrometer stem in the left/right direction, the connecting bracket 105 is moved up/down (in the plane of the paper) via the driving arm 106. As a result, the connected flat plates 102b, 102c change their orientation with respect to the exit optical axis m1 while maintaining the mutual parallelism. This enables the light ray m11 to be shifted in accordance with the movement of the micrometer stem. It is also permissible to use a piezoelectric element or a pulse motor in place of a micrometer.

It is important to maintain the parallelism of the flat plates 102b, 102c, but the separation distance d need not be maintained. Further in this embodiment, the index of refraction of the transparent liquid 103 and that of the flat plates 102a, 102b, 102c and 102d were made to be the same. However, it is not mandatory that they be exactly identical. When there is a large difference in the index of refraction between the two optical media, unwanted reflections can occur at various interfaces, leading to ghost images, color shift and other imaging problems, thus lowering the quality of image reproduction on the screen.

Figure 8:
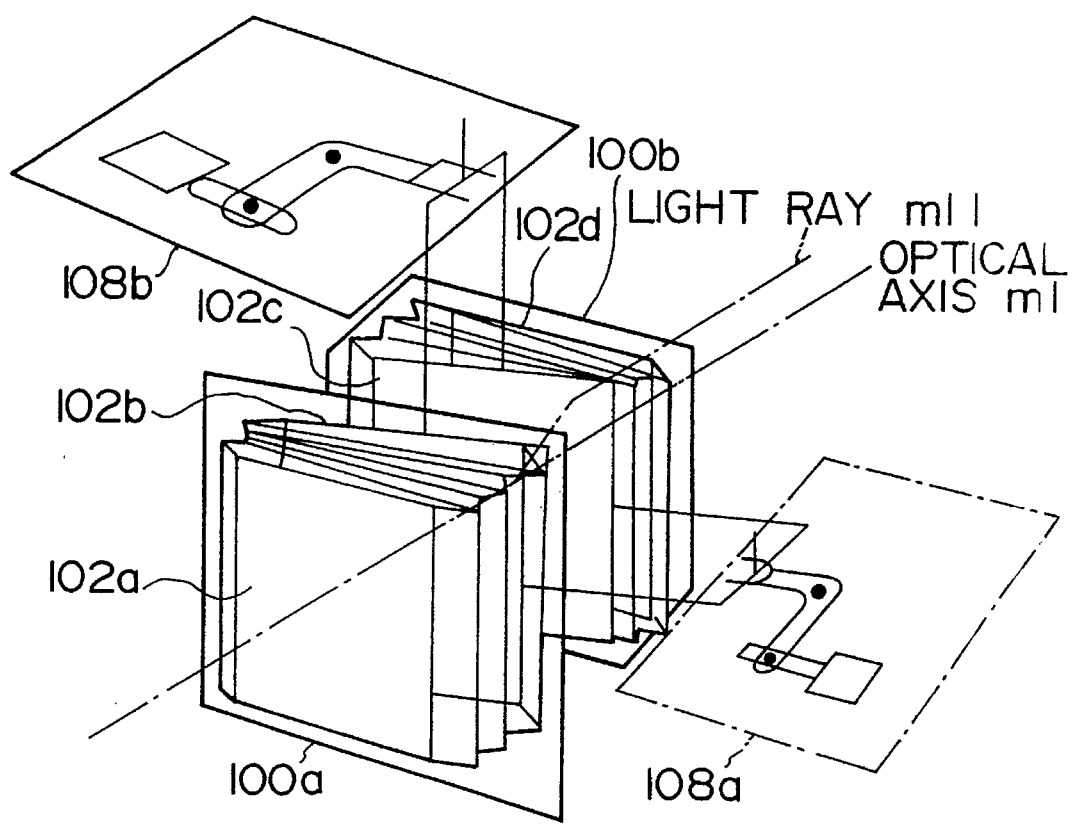
FIG. 8 is a schematic representation of a variation of the optical axis displacement device used in the fifth embodiment of the projection display apparatus of the present invention.

FIG. 8 illustrates a variation of the fifth embodiment presented above, enabling to vary the x- and the z-axes continuously. In this figure, the driving devices 108a, 108b have the same construction as the driving device 108 shown in FIG. 7. The motions described in reference to FIG. 7 can be reproduced for the x- and the z-axes independently by disposing the driving devices 108a and 108b, respectively, on the x- and the z-axes. The individual motions for the driving devices 108a, 108b are the same as those for the driving device 108, and their explanations will be omitted.

Embodiment 6

Figure 9:
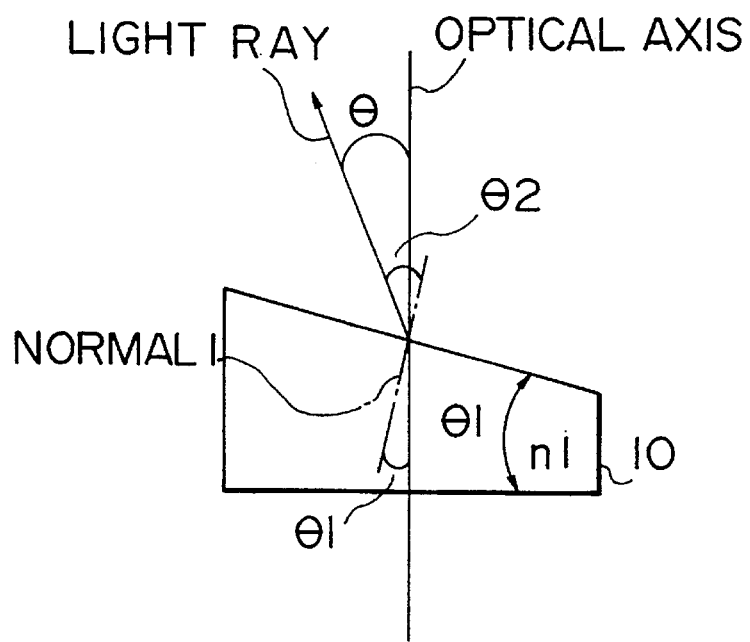
FIG. 9 is a schematic representation of a sixth embodiment related to a transparent wedge material of the projection display apparatus of the present invention.

FIG. 9 is a schematic representation of a sixth embodiment of the optical axis displacement device. The sixth embodiment is a modification of the optical axis displacement element used in the first, second and third embodiments of a transparent wedge material having an inclined surface on one side of the an optical axis displacement device. The device is useful for tilting with respect to the θx-axis and the θz-axis of the light ray shown in FIG. 51. The following explanation is provided only for the case of adjusting in the θx axis direction for brevity. The configuration of the optical system is the same as those presented in FIGS. 1, 2, 3, and their explanations are omitted.

In FIG. 9, a wedge 10 is similar to the wedge 9a shown in FIG. 6, and has an inclined surface and a plane surface which is perpendicular to the optical axis. The angle of inclination to the optical axis is set to be θ1. The illustration shows the incident ray, parallel to the optical axis, entering the wedge 10 at right angles to the plane surface. The incident ray enters the plane surface at an angle θ1 to the inclined surface and is refracted at the ray exit surface of the wedge 10 to enter air at a refraction angle θ2. The exit angle θ of the refracted ray to the optical axis is given by Equation 3.

$$\theta = \theta_2 - \theta_1 = (n_1 - 1) \times \theta_1 \qquad \text{Eqn 3}$$

When the wedge material 10 is disposed between the light valves 51, 52 and the projection lenses 61, 62, the optical axes of the light valves 51, 52 are refracted at the same angle θ. The result is equivalent to rotating the light valves 51, 52 around the axis θx. Similarly, if the wedge 10 is disposed at the exiting surface of the projection lenses 61, 62, the exit ray from the projection lens refracts at the angle θ. The result is equivalent to rotating the light valves 51, 52 around the θx axis.

When the wedge 10 is rotated around the x-axis, the angle θ1 can be varied, and when the wedge 10 is rotated around the y-axis, the direction of the inclined surface can be varied in the plane of the x-z axis. Therefore, the wedge 10 is able to compensate for the image tilt effects of the different light valves on the θx and θz axes.

Embodiment 7

Figure 10:
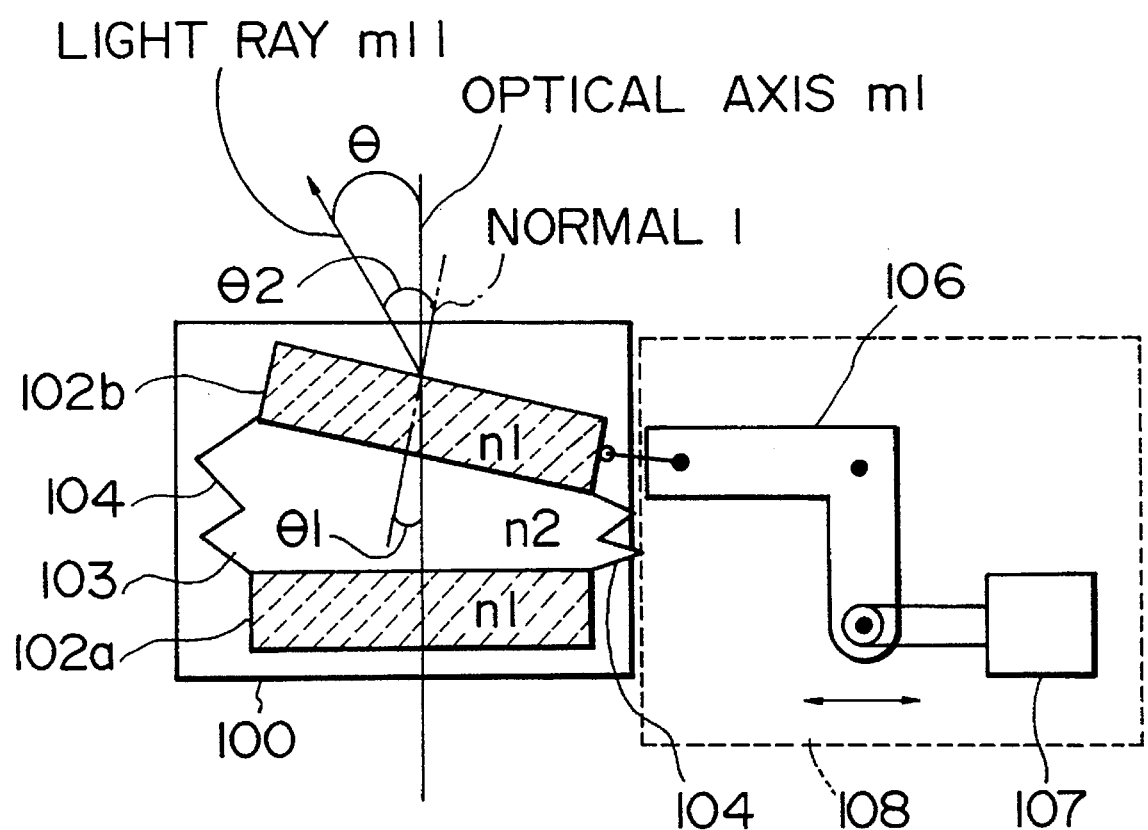
FIG. 10 is a schematic representation of a light ray shift device in a seventh embodiment of the present invention.

FIG. 10 is a schematic representation of the seventh embodiment of a light ray shift device. The seventh embodiment demonstrates the use of the light ray refraction device having the ability to vary the orientating angle, in place of the light shift element used in the first, second and third embodiments. The seventh embodiment is used to biaxially position the image with respect to the θx, θz axes. The explanation is limited to the case of adjusting in the θx axis direction.

The optical element 100 and the driving device 108 are constructed in the same way as the optical elements and the driving device shown in FIG. 7. Consider an incident ray parallel to the optical axis enters the plane surface of the flat plate 102a at right angles to the incident ray surface. The incidence ray enters the flat plate 102b at an angle θ1 between the normal to the flat plate 102b and the optical axis, and exits the flat plate 102b at the exit angle θ as in the previous embodiment. The flat plate 102b is connected to the driving device 108, and the exit angle θ can be varied at will in accordance with the setting on the micrometer 107. By providing the driving device 108 on the x- and the z-axes, the tilting effect of the light valves from the different projectors in the θx axis and the θz axis can be compensated.

Embodiment 8

Figure 11:
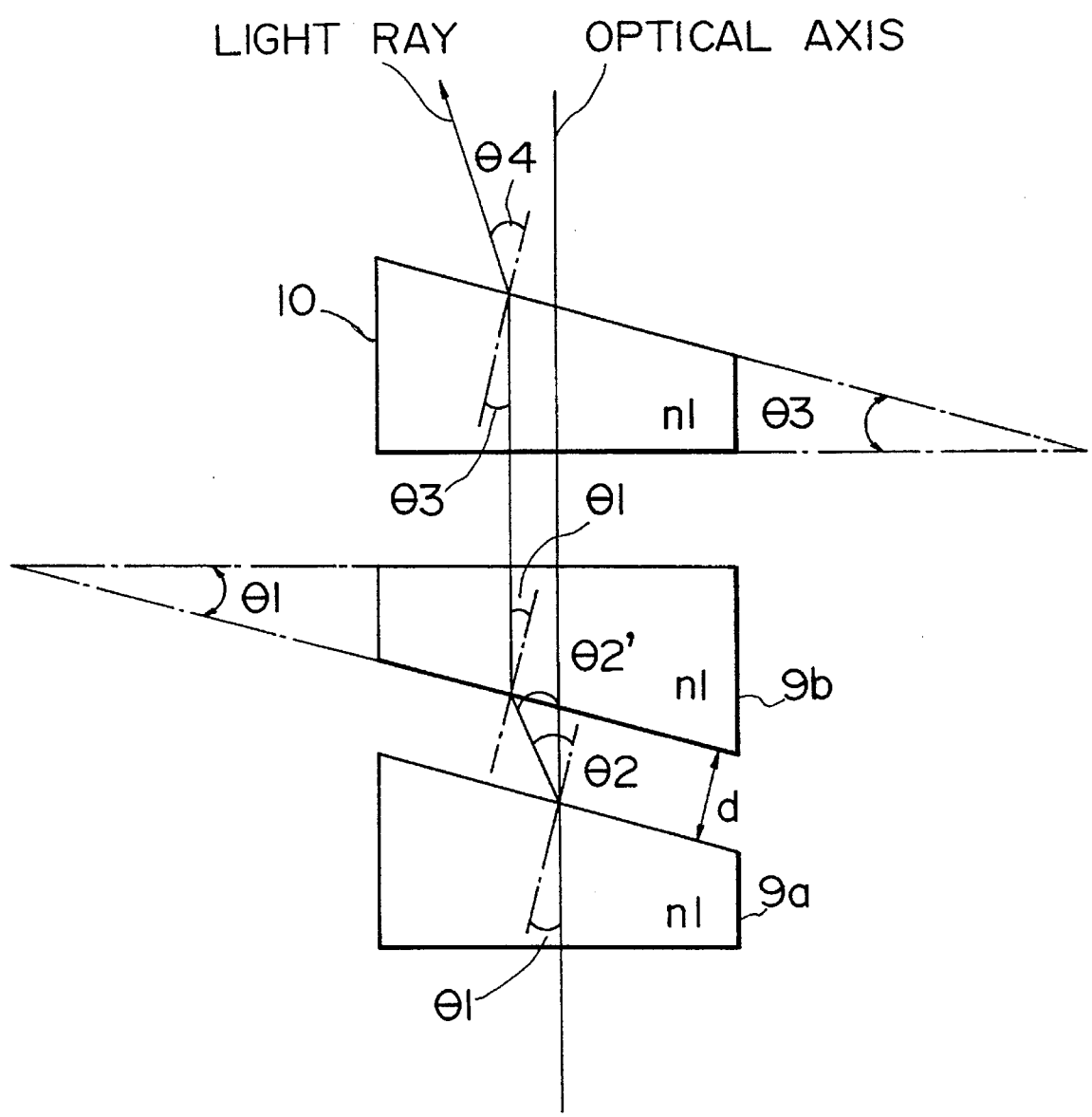
FIG. 11 is a schematic representation of an eighth embodiment of the combination of transparent wedge materials for the projection display apparatus of the present invention.

FIG. 11 is a schematic representation of the eighth embodiment of the optical axis displacement and light ray shift device. This embodiment utilizes three wedge material for the light ray shift element in the first, second and third embodiments, and combines the features of the fourth and sixth embodiments. The optical axis displacements are performed with respect to the x-, z-, θx-, θz-axes. The explanation is provided only for the x-axis and the θx-axis for brevity. The optical system is the same as those presented in FIGS. 1, 2 and 3, and their explanations are omitted.

In FIG. 11, a pair of wedges 9a, 9b are the same as that presented in FIG. 6, and the angle of the inclined surface is θ1, and the two wedges 9a, 9b are disposed with an air gap of spacing d. Another wedge 10 is the same as the wedge presented in FIG. 9, but the inclined surface is sloped at an angle θ3. The exit planar surface of the wedge 9b is facing the planar surface of the wedge 10.

Consider the wedges arranged as shown in FIG. 11, and the incident ray parallel to the optical axis enters the wedge 9a. As explained in FIG. 7, the incident ray passes through the pair of wedges 9a, 9b in the same direction as the incident ray but displaced with a distance S. The ray entering the wedge 10, as explained in FIG. 9, exits the wedge 10 after being refracted by an angle θ=(n−1)×θ3. Therefore, the incident ray entering the wedge 9a is displace by the distance S and exit the three wedges, 9a, 9b and 10, producing the exit angle θ. If such a system of the wedges 9a, 9b and 10, is disposed between the light valves 51, 52 and projection lenses 61, 62, the system is operated in the following way: the air gap distance between the wedges 9a, 9b is made variable, the pair of wedges 9a, 9b is rotated around the y-axis, and the wedge 10 is rotated around both the x- and the y-axes independently. The adjustments can be made in the x- and z-axes directions, and image tilting in the θx- and θz-axes directions. Similarly, if the wedges 9a, 9b and 10 are disposed in front of the projection lenses 61, 62, as shown in FIG. 2, the exit ray from the projection lenses 61, 62 is shifted in the x-axis direction by a distance S, and is rotated by an angle θ in the θx direction, thereby permitting adjustments in the x- and z-axes directions, and compensate for the image tilting effects in the θx- and θz-axes directions.

Embodiment 9

Figure 12:
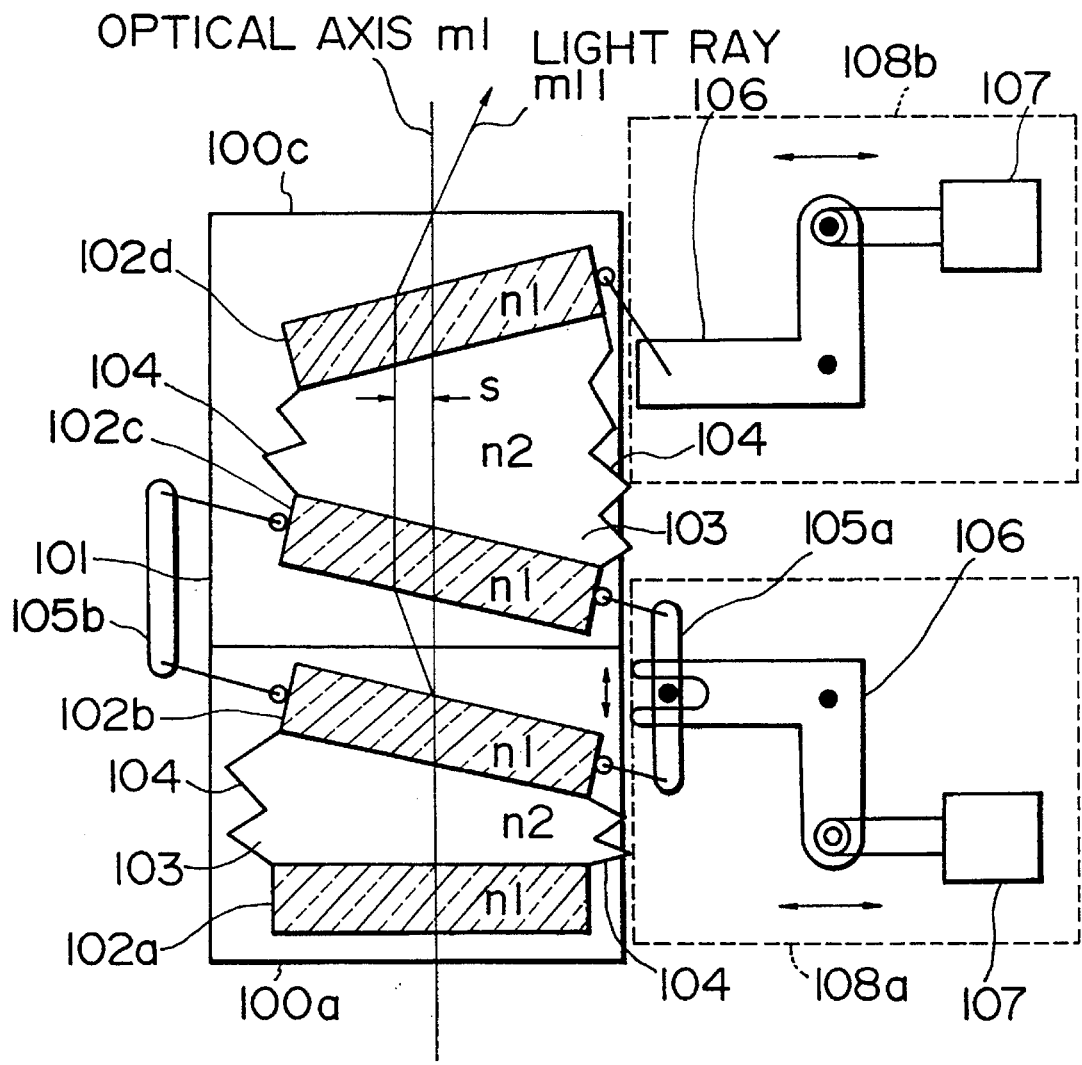
FIG. 12 is a schematic representation of optical components in a ninth embodiment of the projection display apparatus of the present invention.

FIG. 12 is a schematic representation of the ninth embodiment of the optical axis displacement device. This embodiment utilizes two optical elements, each optical element containing two flat plate. One flat plate set in one optical element is coupled to another flat plate set of the other optical element, and the two flat plates are maintained parallel and the orientation of the coupled flat plates are adjustable as a pair. The orientation of the third flat plate is adjustable independently of the other three flat plates. The optical axis displacements are performed with respect to the x-, z-, θx-, θz-axes. The explanation is provided only for the x-axis and the θx-axis for brevity. The optical system is the same as those presented in FIG. 11, and the explanation is omitted.

In FIG. 12, an optical element 100a and a driving device 108a are constructed in the same as the optical element and the driving device explained in FIG. 7. An optical element 100c is the other optical element, which contains a flat plate 100d whose orientation with respect to the optical axis can be adjusted, in contrast to the fixed right angles orientation of the flat plate 102d in the fifth embodiment. The driving device 108b permits changes in the orientation of the flat plate 102d with respect to the optical axis, and the flat plate 102a is fixed at right angles to the optical axis.

When the micrometer 107 of the driving device 108a is moved in the left/right direction, the connecting bracket 105a moves vertically (in the plane of the paper) via the connecting arm 106, and the coupled flat plates 102b, 102c change the orientation angle with respect to the optical axis m1 while maintaining the parallelism therebetween. When the micrometer 107 of the driving device 108b is moved left/right, the driving arm 106 rotates and changes the orientation angle with respect to the optical axis m1.

The above arrangement permits the incident ray striking the flat plate 102a at right angles to shift by a distance S depending on the orientation of the flat plates 102b, 102c, and produces further exit angle θ depending on the orientation of the flat plate 102d. The adjustments in the linear positions in the x- and z-axes directions as well as in the image quality in the θx axis and θz axis directions can thus be made.

Embodiments 10 to 14

FIGS. 13 to 17 are schematic side views of the tenth to fourteenth embodiments of the projection display apparatus. These embodiments are applicable to a plurality of projection display modules having a projection lens configuration shown in FIG. 49, and involve disposing different light shift elements at the entry side and the exit side of the projection lens system. However, in FIGS. 13 to 17, only one projection module is shown for brevity.

All the embodiments are concerned with adjustments of positions in the x- and z-axes direction as well as the image quality in the θx- and θz-axes directions. The optical effects are as described for the light shift elements presented in FIGS. 5 to 12, and their explanations are omitted.

Figure 13:
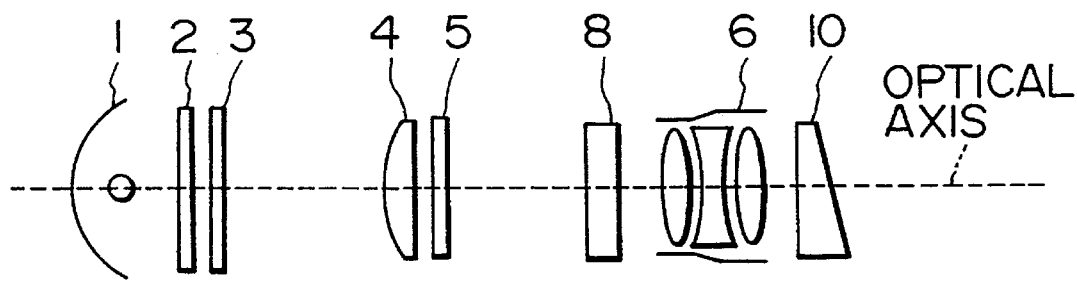
FIG. 13 is a schematic representation of optical components in a tenth embodiment of the projection display apparatus of the present invention.

FIG. 13 shows a case of disposing the flat plate 8 shown in FIG. 5 at the ray entry side, and the wedge material 10 shown in FIG. 9 at the exit side of the projection lens 6.

Figure 14:
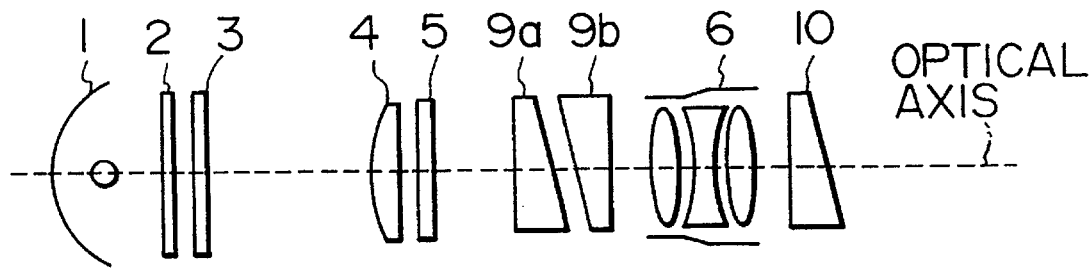
FIG. 14 is a schematic representation of optical components in an eleventh embodiment of the projection display apparatus of the present invention.

FIG. 14 shows a case of disposing the wedge materials 9a, 9b shown in FIG. 6 at the ray entry side, and the wedge material 10 shown in FIG. 9 at the exit side of the projection lens 6.

Figure 15:
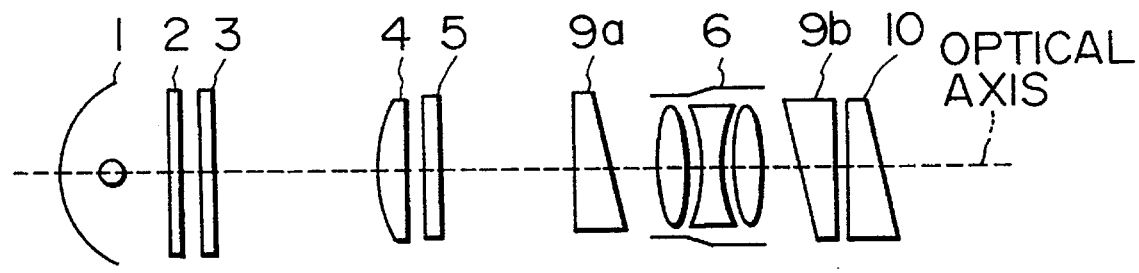
FIG. 15 is a schematic representation of optical components in a twelfth embodiment of the projection display apparatus of the present invention.

FIG. 15 shows a case of disposing the wedge material 9a of the wedges 9a, 9b shown in FIG. 6 at the ray entry side, and the wedge material 10 shown in FIG. 9 at the exit side of the wedge material 9b.

Figure 16:
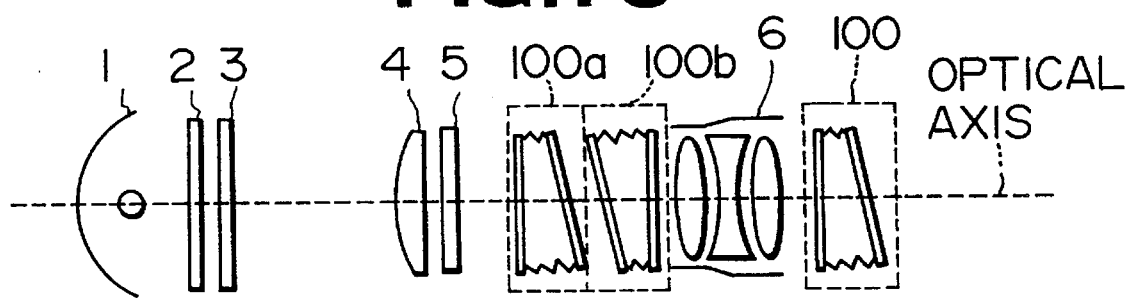
FIG. 16 is a schematic representation of optical components in a thirteenth embodiment of the projection display apparatus of the present invention.

FIG. 16 shows a case of disposing an optical axis displacement device 100a, 100b having an adjustable inclined surface at the entry side of the projector lens 6, and the optical element 100 of an optical axis displacement device shown in FIG. 10 at the exit side of the projector lens 6.

Figure 17:
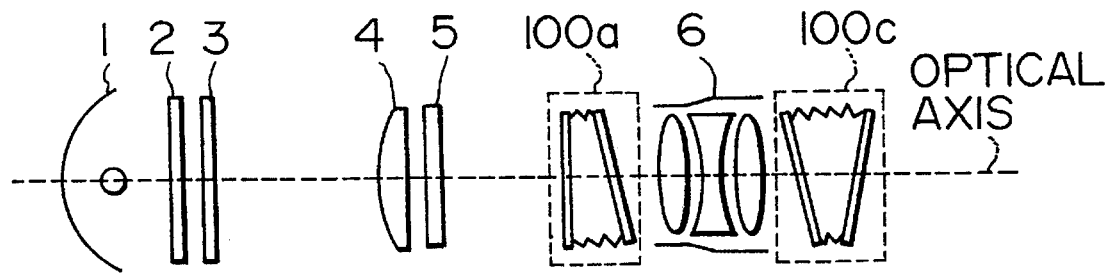
FIG. 17 is a schematic representation of optical components in a fourteenth embodiment of the projection display apparatus of the present invention.

FIG. 17 shows a case of disposing the optical elements 100a, 100b, having an adjustable inclined surface, at the entry side of the projector lens 6, and the optical element 100c at the exit side of the projector lens 6.

Embodiment 15

Figure 18:
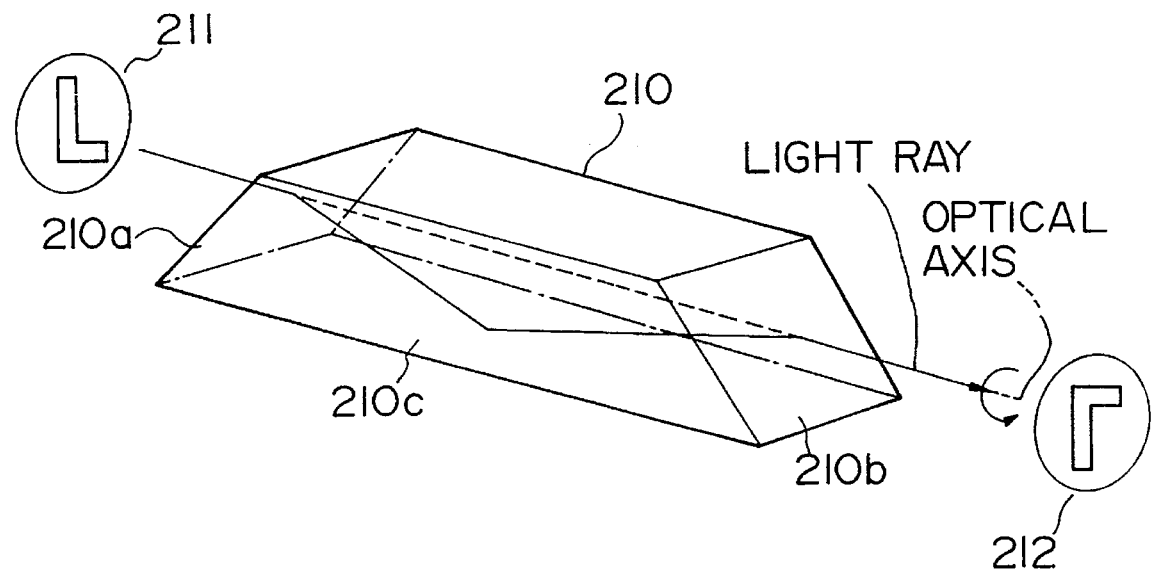
FIG. 18 is a schematic representation of a fifteenth embodiment of the projection display apparatus of the present invention.

FIG. 18 is a schematic representation of a fifteenth embodiment of the projection display apparatus, relating to an image inversion or rotation device. For brevity, the explanation of the device shown in FIG. 18 is provided for θy axis direction only. The image rotation device is a pedestal shaped image rotation prism 210 whose long axis is disposed parallel to the optical axis of a projection lens. The incident ray enters the image rotation device 210 from the incident ray surface 210a, and exits from the exist surface 210b. The incident ray is made to totally reflected from the bottom surface 210c by either coating the bottom surface 210, or setting the angle of orientation of the incident ray surface 210a. The angle between the bottom surface 210c and the incident ray surface 210a is the same as the angle between the bottom surface 210c and the ray exit surface 210b. Therefore, when a ray parallel to the optical axis enters the incident ray surface 210a, the ray refracts at the incident ray surface 210a, it is then totally reflected at the bottom surface 210c, and exits from the exit ray surface 210b in the same direction as the incident ray. When an image 211 enters this image rotation device 210, the image is totally reflected at the bottom surface 210c, thereby inverting the image 211. The exit image 212 exiting from the exit ray surface 210b is not displaced (refracted) and proceeds in the same direction as the incident ray, but it is an inverted image of the incident image 211. Therefore, if the image rotation device 210 is rotated through some angle, the exiting image 212 is also rotated. By disposing this image rotation device 210 to the light ray shift devices shown in FIGS. 5 to 17, the image rotation about the θy-axis can be adjusted.

Embodiment 16

FIGS. 19 to 21(b) illustrate a sixteenth embodiment of the projection display devices of the present invention. This embodiment relates to a test pattern for adjusting the position of a projected image, by computing the amount of shift, from a predetermined position, present in the image, and adjust the actuators so as to positions the image in the correct optical position.

Figure 19:
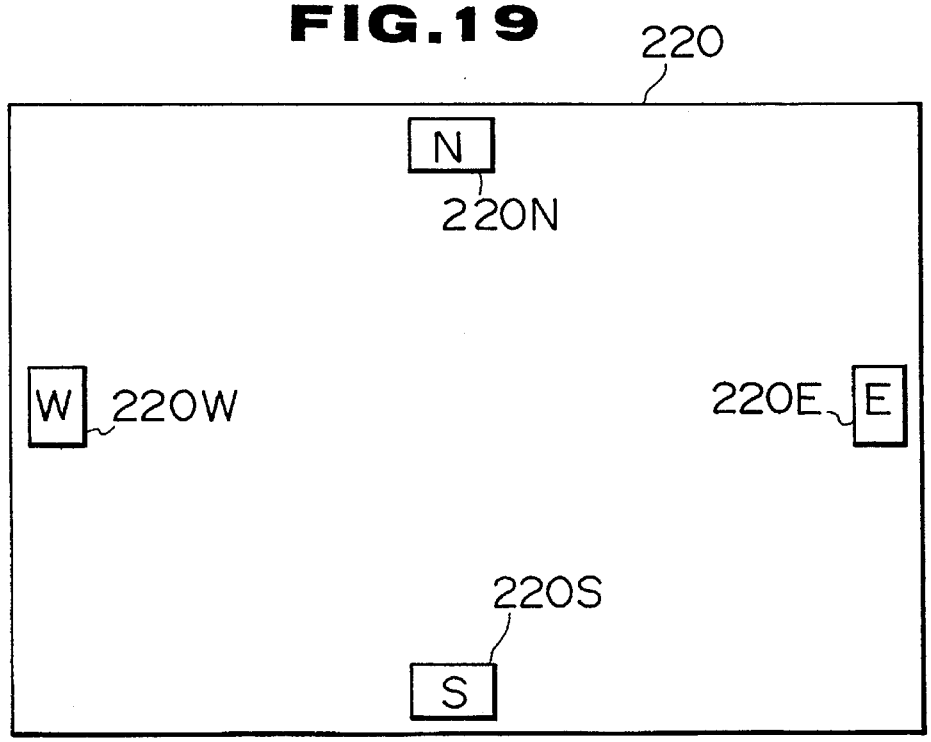
FIG. 19 is a schematic representation of a sixteenth embodiment of the projection display apparatus of the present invention.

In FIG. 19, there are four test pattern display regions, 220N, 220S, 220W and 220E, at the four corners of a screen 220.

Figure 21A:
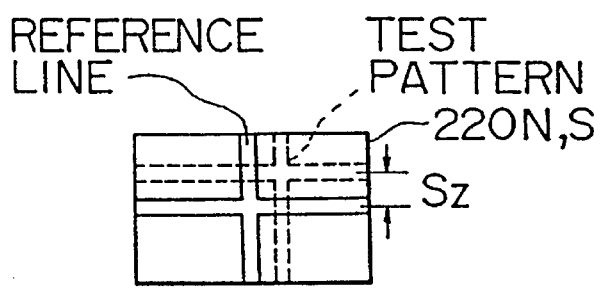
FIGS. 21(a) and 21(b) illustrate a method of determining the degree of displacement of a test pattern in an N-S direction and an E-W direction, respectively.
Figure 21B:
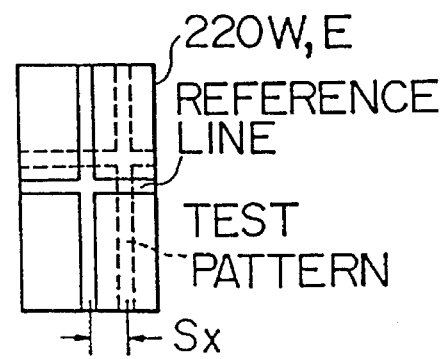

FIGS. 20, 21(a) and 21(b) are control schematics of the actuator devices for use with the screen 220. For brevity, the explanation is provided for a case of using one projector. In a projection display projector 222 shown in FIG. 20, four actuators, 223, 225, 226 and 228 control the adjustments of an image with respect to the x-, z-, θx-, and θz-axes, respectively. The actuators 224, 227 are for controlling the position in the y-, and θy-axis direction. The projector 222 displays the test pattern in the test pattern display regions, 220N, 220S, 220W and 220E, which are recorded with image sensors 221N, 221S, 221W and 221E.

A checking circuit 229 analyzes condensing of the test pattern image recorded with the image sensor 221N, 221S in the N-S direction, and accordingly adjusts the actuators 224, 226 to position the image clearly. Similarly, a checking circuit 230 analyzes condensing of the test pattern image recorded with the image sensors 221W, 221E, and accordingly adjusts the actuator 228. A checking circuit 231 analyses image displacement of the test pattern image recorded with the image sensors 221W, 221E in the E-W (i.e. x-axis direction), and accordingly adjusts the actuator 223. A checking circuit 232 analyses image displacement of the test pattern image recorded with the image sensors 221N, 221S in the z-axis direction and adjusts the actuator 225 accordingly. A checking circuit 233 analyzes tilting shift of the test pattern image recorded with the image sensors 221W, 221E in the θy-axis direction, and adjusts the actuator 227 accordingly.

Focus checking performed by the checking circuits 229, 230 is performed by, for example, extracting the pixel shape from the test patterns on the screen, and measuring the vertical and horizontal sizes of the pixel image, and adjusting the actuators until a minimum size of the pixel is obtained.

Image displacement checking with the checking circuit 231, 232 is performed as illustrated in FIG. 21. FIG. 21 shows a cross pattern shown in the test pattern display regions 220N, 220S. Image displacement in the z-axis direction is detected from the test pattern shown in 220N (or 220S), as shown in FIG. 21 (a), by measuring the amount of displacement Sz in the z-axis between the test pattern and the predetermined position of the reference cross, and operating the actuator 223, accordingly. The image displacement in the x-axis direction is detected from the test pattern shown in the test pattern display region 220W (or 220E), as illustrated in FIG. 21 (b), by measuring the amount of displacement Sx in the x-axis between the test pattern and the predetermined position of the reference cross, and operating the actuator 225, accordingly.

The rotational shift of the image (θy-axis), around the light ray, detected by the checking circuit 233 is determined by measuring the angle between the horizontal line of the reference cross and the line joining the crossing points of the reference test pattern and the projected image, and operating the actuator 227 accordingly.

When all the adjustments are made on one projector, the adjustments for other projectors are made on the basis of the test pattern established on the first projector, and in accordance with the logics described above. The methodology used in adjustments is not limited to that presented in FIGS. 20 and 21.

Embodiment 17

Figure 22:
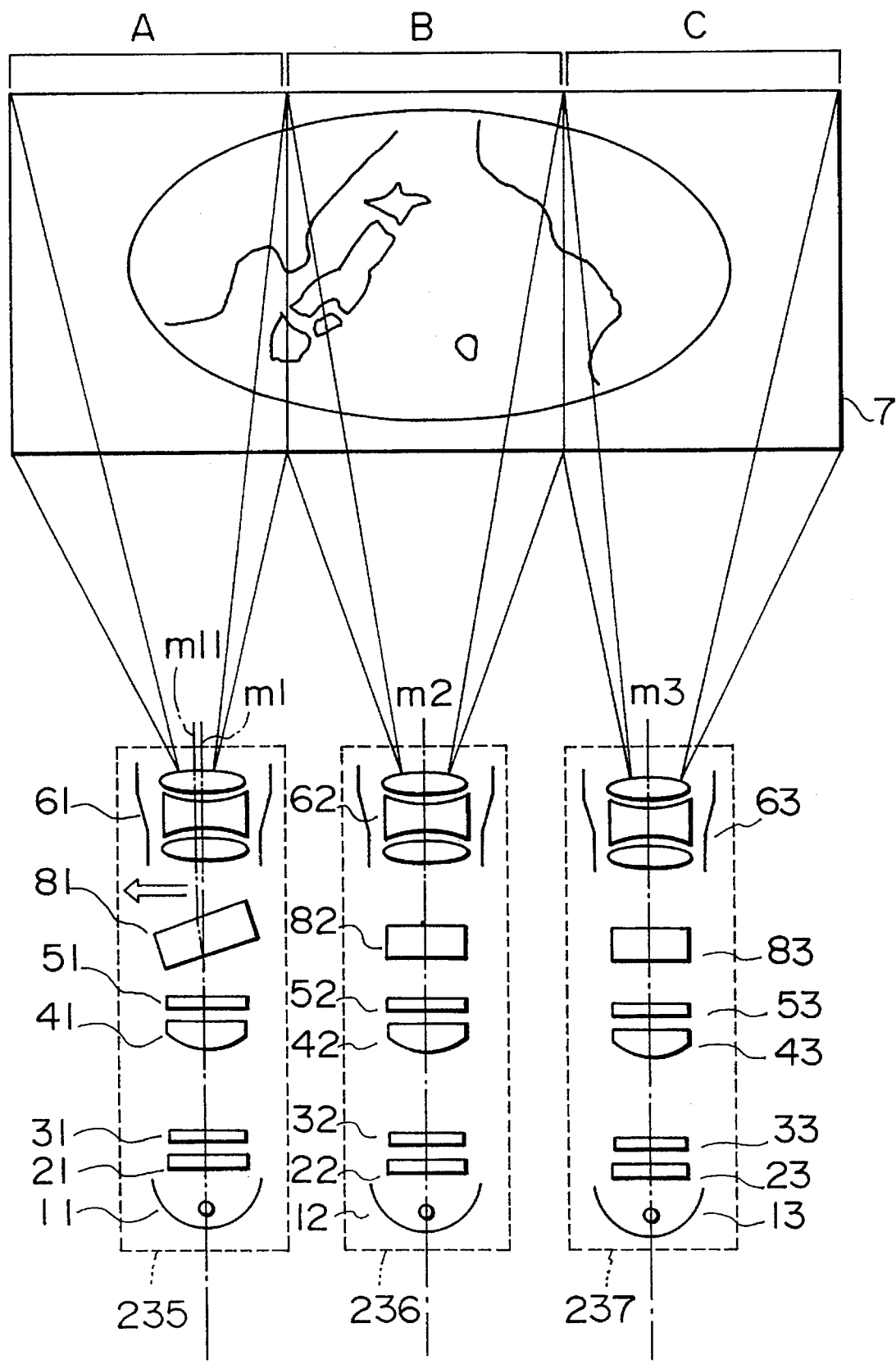
FIG. 22 is a schematic representation of a seventeenth embodiment of the projection display apparatus of the present invention.

FIG. 22 is a schematic representation of the seventeenth embodiment of the projector display device. The reference numerals 235, 236 and 237 refer to projector display devices; 7 is a screen; 11, 12, 13 are light sources; 21, 22, 23 are IR and UV filter for the light ray generated from the light sources 11, 12, 13 respectively; 32, 32, 33 are optical filters; 41, 42, 43 are condensor lenses; 51, 52, 53 are light valves; 61, 62, 63 are projection lenses; and 81, 82, 83 are transparent flat plate materials (shortened to flat plates).

This is an embodiment presenting a wide vision screen which differs from the standard projection screens having a vertical/horizontal ratio of 3:4. The screen 7 consists of three display regions A, B and C. An image is displayed in the display region A by a projector 235, in the display region B by a projector 236 in, and in the display region C by a projector 237, and the images from the three display regions are joined to present a wide vision display. Therefore, at the joint regions of the three displays, there is a need to perform continuity adjustments.

The seventeenth embodiment deals with a case of adjusting the image in the z-axis direction. For example, when the projector 235 projects an image on the display region A, and the right edge of the projected image overlaps the display region B. Pixel coherence is produced by tilting the flat plate 81 of the projector 235 somewhat with respect to the optical axis m1 so as to shift the optical path to m11. That is, pixels are adjusted by shifting the image from the projector to the left until the coherence is obtained at the right side edge of the display region A. Similarly, the images are shifted to the left to obtain coherence in the right side boarder of each of the display region. For adjusting in the direction of the x-, z-, θx-, θy- and θz-axes, light shift elements shown in the first to the seventeenth embodiments can be used. The optical behaviors of the light shift devices are the same as those already described in FIGS. 5 to 12, and their explanations are omitted.

Embodiment 18

Figure 23:
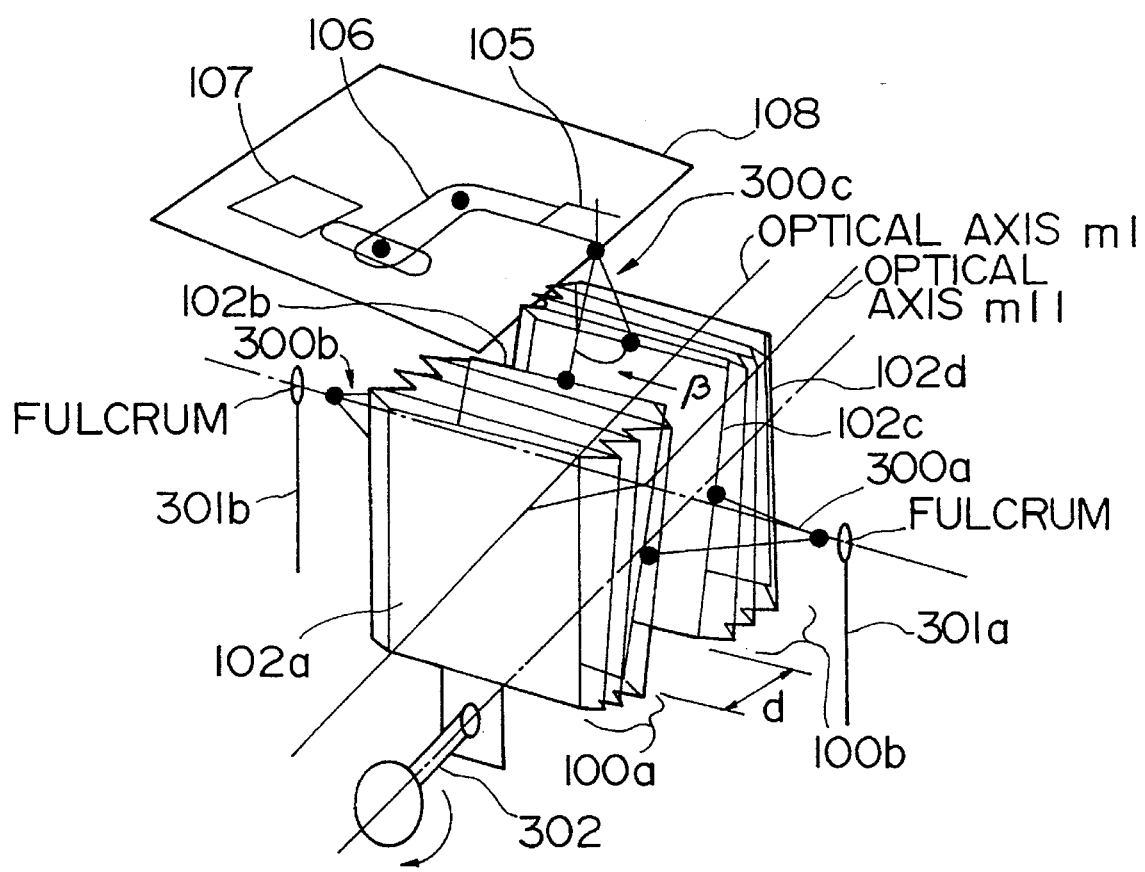
FIG. 23 is a schematic representation of an optical axis displacement device of the eighteenth embodiment of the projection display apparatus of the present invention.

FIG. 23 is a schematic representation of the eighteenth embodiment of the light ray shift device. The device shown in FIG. 23 enables to provide adjustments continuously at will in the z-axis direction, as well as the amount of shift S. The driving device 108 comprises a connecting bracket 105; driving arm 106; and a micrometer 107. The reference numerals 300a, 300b and 300c refer to an inverted Y-shaped universal joint, which freely permits adjustment of the occluded angle β between the Y. When the micrometer 107 is moved left/right, the connecting bracket 105 moves up/down (in the plane of the paper in FIG. 23) via the driving arm 106, and moving a connected pair of flat plates 102b, 102c while maintaining their parallelism, thereby changing the angle of the exit ray with respect to the optical axis m1. The amount of shift of the optical axis between the incident optical axis m1 and the exit optical axis m11 can thus be adjusted continuously at will by moving the micrometer 107. This optical axis displacement device is provided with a rotational shaft 302 which is threadingly connected to the optical elements 100a, 100b, each of which is oppositely threaded. When the rotational shaft 302 is rotated, the optical element 100a, 100b translates in the opposite directions allowing the distance d between the flat plates to vary, and thereby enabling to vary the amount of axial shift S at will. The construction of the optical elements and the amount of axial shift are as described in the fifth embodiment.

Embodiment 19

FIG. 24(a) is a schematic representation of a side view of a nineteenth embodiment of the optical axis displacement device in accordance with the present invention; FIG. 24(b) shows a front view of the device; and FIG. 24(c) illustrates a top view of the device. This embodiment relates to a biaxial adjustment device to displace the optical axis of the device of the fifth embodiment shown in FIG. 17, in the x- and z-axes directions.

The device shown in FIGS. 24(a) and 24(b) comprises tow flat plates 102a, 102b joined with bellows comprising one optical system and 102c, 102d with bellows comprising another optical system. The two optical systems are provided with a spacer 400 which sets the separation distance between the flat plates 102b, 102c, and also maintains them in parallel. The spacer 400 can be rotated around the z-axis 401, and around the x-axis 402 via a frame 404 which supports the spacer 400. The frame 404 is supported on a base 405, which allows the frame to be rotated around the z-axis. The spacer 400 is freely and independently rotatable around the x- and z-axes.

FIG. 24 (c) is a top view of the optical axis displacement device, and also shows a rotating arm 406 attached to the spacer 400. When the rotator arm 406 is pushed in the direction of the arrow in this figure, the rotating arm 406 pivots around the fulcrum 408, and moves the spacer 400 against the force of a spring 408 retaining the spacer 400 in position. The result is a rotation of the spacer 400 around the z-axis 401. The rotator arm 406 is also provided for the support base 405 so as to rotate the spacer 400 around the x-axis.

Embodiment 20

Figure 25:
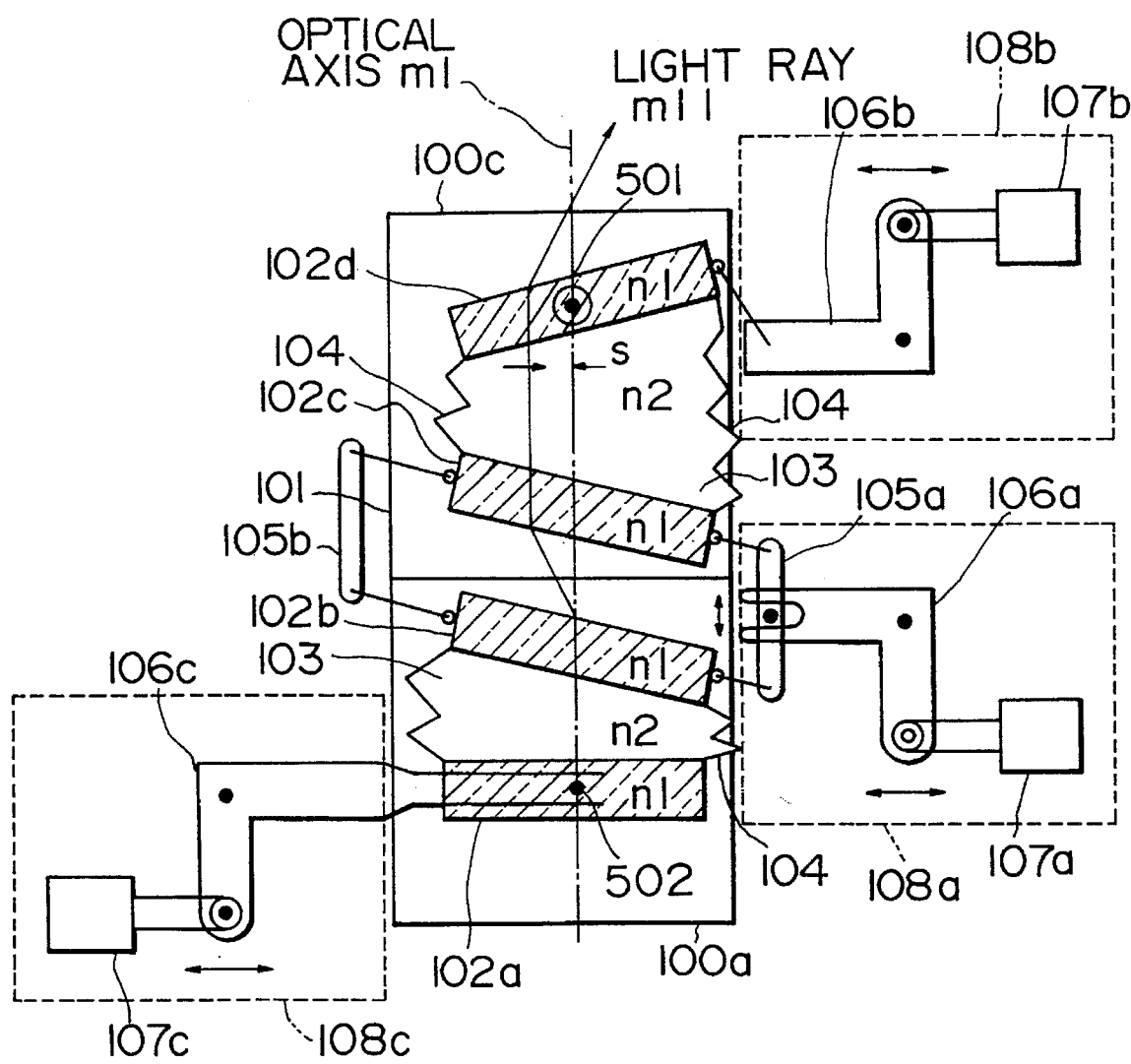
FIG. 25 is a schematic top view of optical elements for the twentieth embodiment of the projection display apparatus of the present invention.

FIG. 25 is a schematic representation of a twentieth embodiment of the optical axis displacement device, in which the orientation (which was shown in FIG. 12) of the optical axis displacement device used in the first, second and third embodiments can be varied as shown in this figure.

In the arrangement which was shown in FIG. 12, the orientation of the flat plate 102d was able to be varied with respect to both the x- and the z-axes. In the embodiment shown in FIG. 25, the orientation of each of the flat plates 102a, 102d can be varied in different directions on one optical axis so as to adjust for the tilt of the image in the θx- and θz-axis directions. The operation is as follows.

The flat plate 102d rotates around the z-axis 501 while the flat plate 102a rotates around the x-axis 502. Left/right movement of the micrometer 107 drives the driving arm 106c up/down, and the flat plate 102a rotates around the x-axis 502. Other mechanisms are the same as described in the ninth embodiment, and their explanation will be omitted.

Embodiment 21

Figure 26:
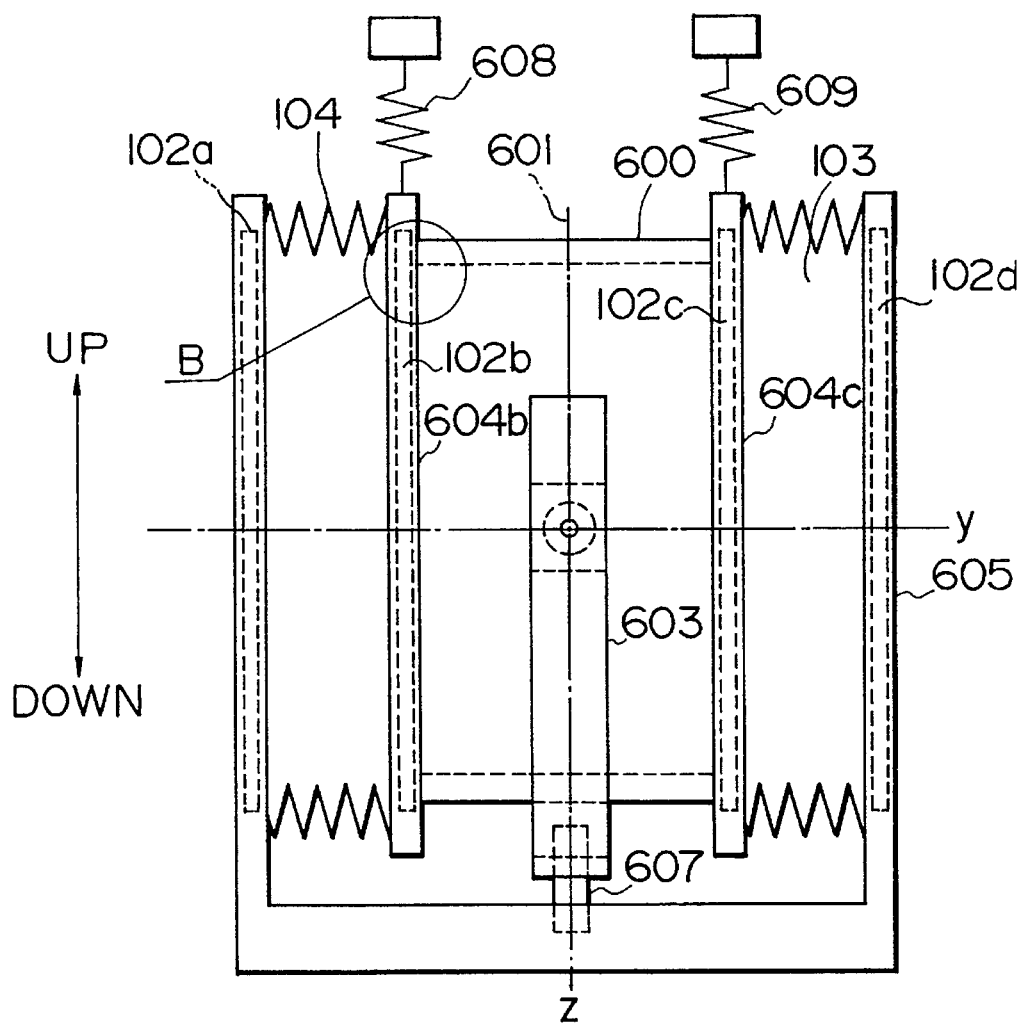
FIG. 26 is a side view of a twenty-first embodiment of the optical elements for the projection display apparatus of the present invention.
Figure 27:
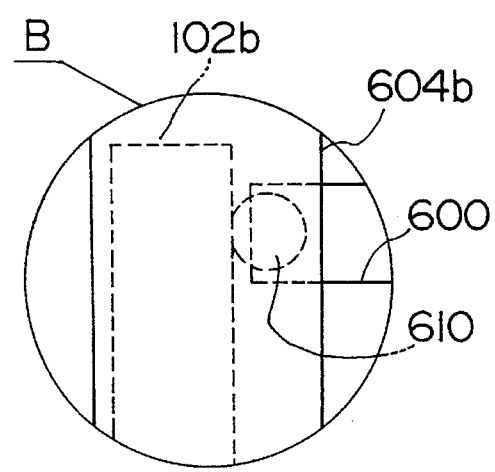
FIG. 27 is a partial enlargement of a section of FIG. 26.
Figure 28:
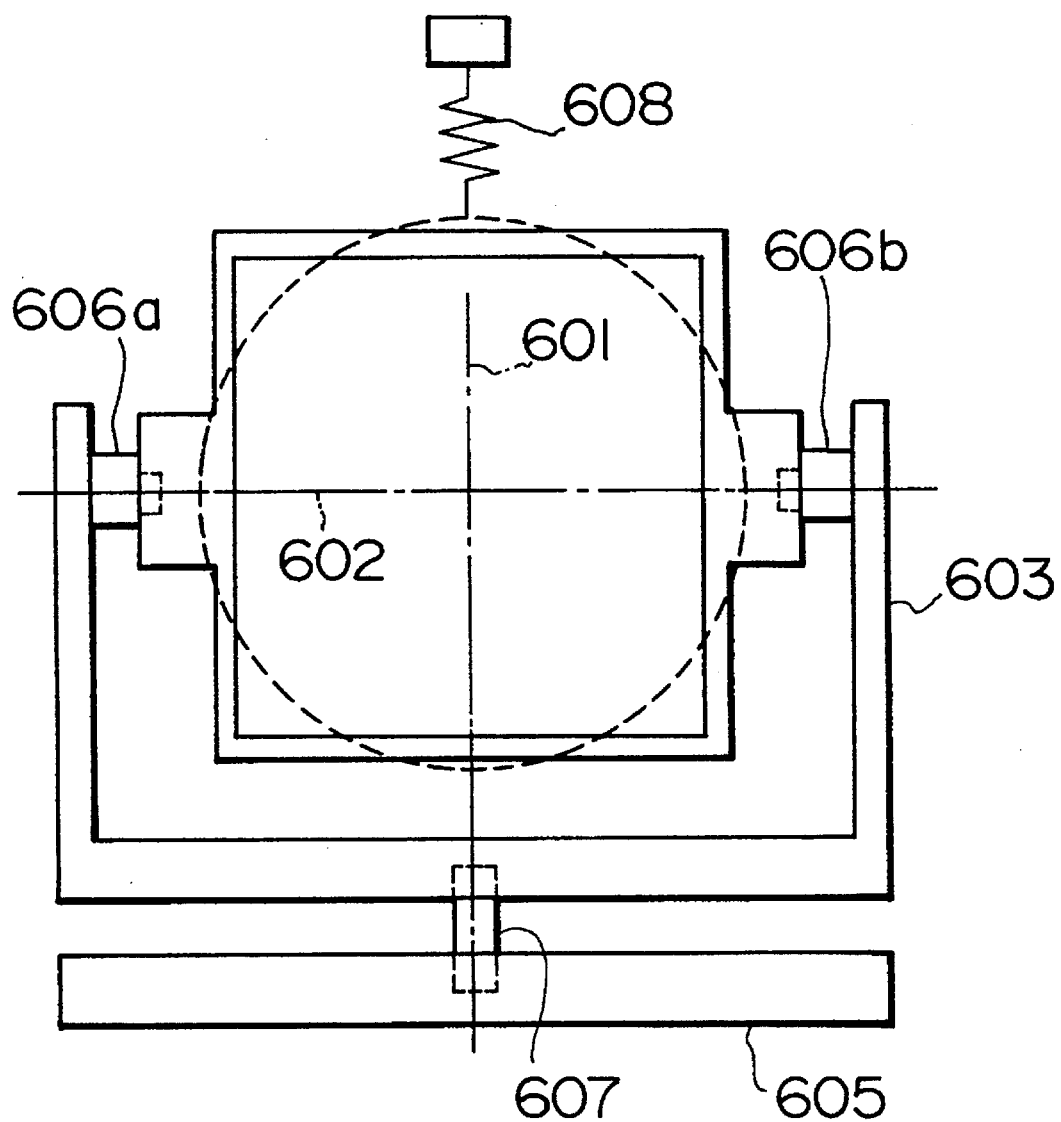
FIG. 28 is a front view of the device shown in FIG. 26.

FIG. 26 is a side view of a twenty-first embodiment of the optical axis displacement device. FIG. 27 is an enlargement of a part of the device, and FIG. 28 is a cross sectional view of the device including the z-axis 601 and the x-axis 602.

This embodiment is a variation of the device, which was shown in FIG. 7 for the fifth embodiment, for displacing the optical axis in the directions of the x- and the z-axes. Further, the difference of this embodiment from the nineteenth embodiment shown in FIG. 24 is that the rotational axes of the spacer and the flat plate are different.

A spacer 600 is provided also in this device to maintain the parallelism of the flat plates 102b, 102c. The flat plates 102b and 102c are not firmly fixed to the spacer 600 as in the nineteenth embodiment, but they are disposed so that although they are in contact with the spacer 600 but they can slide with respect to the flat plate 102b, 102c. To reduce the contact friction, an arrangement such as the one shown in FIG. 27 may be used. This arrangement comprises a plurality of metal spheres 610 disposed between the spacer and the respective flat plates 102b, 102c. The spacer 600 is arranged so that it is able to rotate around both the z-axis 601 and the x-axis 602, shown in FIG. 28.

The device is provided with a retaining frames 604b, 604c for holding the flat plates 102b, 102c. A support shaft 603 freely rotatably supports the spacer 600 via the pegs 606a, 606b disposed in the direction of the x-axis 602. When the spacer 600 is rotated around the x-axis 602, the flat plates 102b, 102c are subjected to a rotational torque, but because the flat plates 102b, 102c are not fixed to the spacer 600, they can rotate independently around an axis different from the x-axis.

The device is provided with a support frame 605, for supporting the flat plates 102a, 102d, and being held by a peg 607 for rotating the support shaft 603. Therefore, the spacer 600 is able to rotate around the z-axis 601. In this case, the flat plates 102b, 102c rotates around the x-axis, but the spacer 600 is not directly driven by the driving device for the support frame 605, and the spacer rotation around the z-axis does not affect the around the x-axis.

Conversely, when the spacer 600 is rotated around the x-axis 602, the support shaft 603 does not rotate around the z-axis 601. The rotation of the spacer 600 and the support shaft 603 can be performed with, for example, a mechanism such as the one shown in FIG. 24 (c) disposed on the side surfaces of the spacer 600 and the support shaft 603. The device of the twenty-first embodiment is thus able to provide a biaxial rotation in the x- and z-axis directions to provide displacement in the both axial directions while keeping the flat plates 102b, 102c in parallel.

Because of the weight of the transparent liquid 103 and the assemblies of the flat plates, the seal 104 deform slightly, and the load on the pegs of the spacer 600 increases. The springs 608, 609 provide suspension for the support frames 604b, 604c which tend to sag vertically down along the surface of the spacer 600 because of its own weight. However, if the rotational resistance is not a problem, such springs 608, 609 are not necessary.

In this embodiment, the mechanism of adjustments for the tilt in the θx-, θz-axis directions is not provided, but if such adjustments are desired, a device shown in FIG. 25 can be provided for the flat plates 102a, 102d.

Embodiment 22

Figure 29:
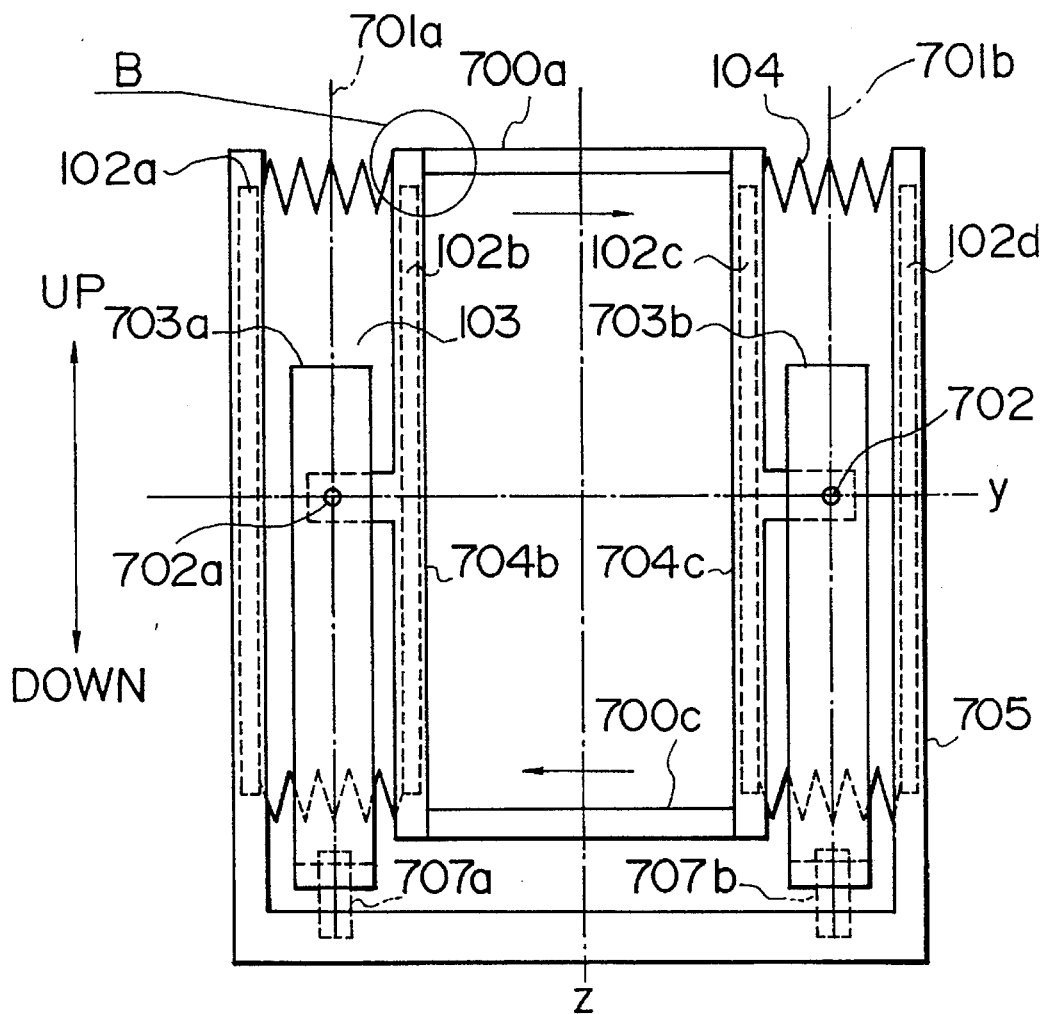
FIG. 29 is a side view of a twenty-second embodiment of the projection display apparatus of the present invention.
Figure 30:
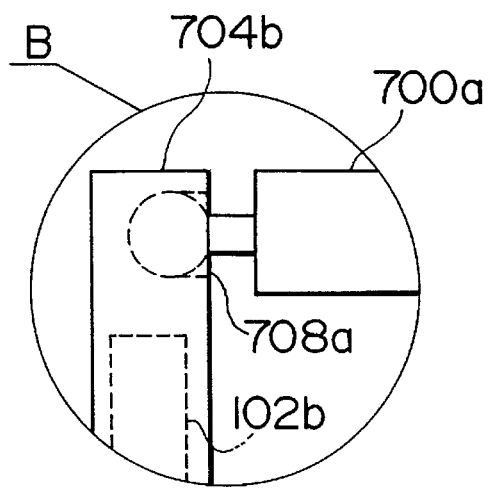
FIG. 30 is an enlarged view of a part of FIG. 29.
Figure 31:
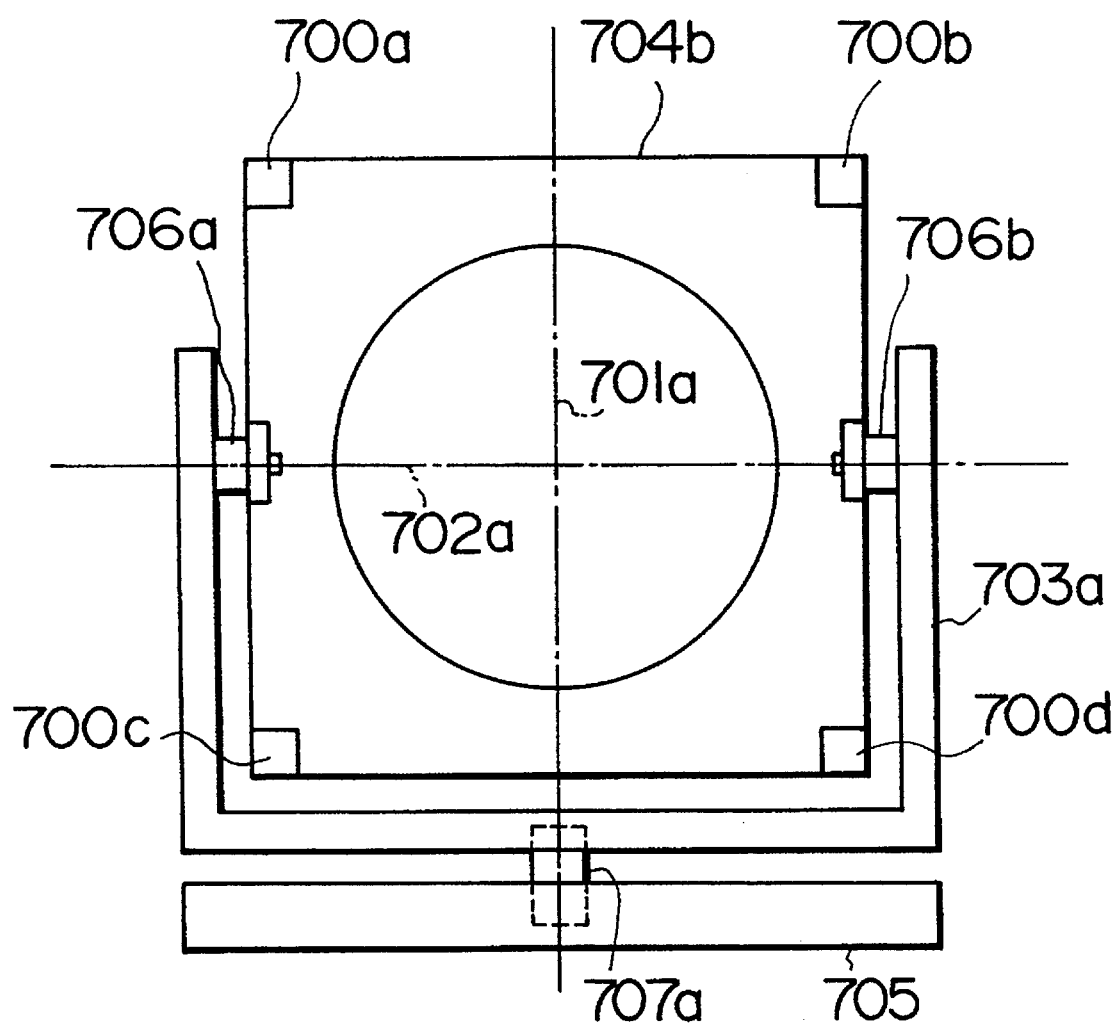
FIG. 31 is a front view of the rotational shaft shown in FIG. 29.

FIG. 29 is a side view of a twenty-second embodiment of the optical axis displacement device. FIG. 30 is an enlargement of region B of the device, and FIG. 31 is a front view of the device shown in FIG. 29.

The device of embodiment 22 is a variation of the biaxial adjustment device of the fifth embodiment, shown in FIG. 7, which provided a biaxial adjustment in the x-, z-axis directions. Also the difference between this embodiment and embodiment 21 shown in FIG. 30 is that the spacer rotated in embodiment 21, but in this embodiment, the spacer moves linearly.

The spacers 700a, 700b, 700c and 700d are provided to maintain the flat plates 102b, 102c in parallel. The flat plates 102b, 102c are held in support frames 704b. 704c, respectively. The spacers 700a, 700b, 700c and 700d are provided at the four corners of the support frames 704b, 704c. The flat plates are not fixed to the spacer as in embodiment 19, but are freely movably disposed in three directions. Such a configuration is illustrated in FIG. 30.

FIG. 30 is an enlargement of the contact region between the spacer 700a and the support frame 704b. At the end of the spacer 700a, there is a connecting member 708a with a sphere-shaped tip, which moves freely within a cavity disposed in the support frame 704b. Such a connecting member 708a is provided at both ends of the spacers 700a, 700b, 700c and 700d. The support frame 704b rotates around the z-axis 701a and around the x-axis 702a, shown in FIG. 31. The support frame 704c rotates around the z-axis 701b and around the x-axis 702b (not shown).

The support shaft 703a is supported by the pegs 706a, 706b disposed on the x-axis 702a, and rotates the support frame 704b around the pegs 706a, 706b. The support shaft 703b has the same construction as the support frame 703a.

It follows that the flat plates 102b, 102c are rotated, respectively, around the x-axis 702a and around the x-axis 702b. Normally, the rotational axis is chosen so that the torque required for rotation is at a minimum.

The support frame 705 supports the support shaft 703a with a peg 707a disposed in the direction of the z-axis 701a, and similarly with a peg 707b disposed in the direction of the z-axis 701b, The support shaft 703a is rotated around the peg 707a, and the support shaft 703b is rotated around the peg 707b.

Therefore, the flat plates 102b rotates around the z-axis 701a, and the flat plates 102c rotates around the z-axis 701b. Because the spacers 700a, 700b, 700c and 700d are not driven directly, the rotation of the support shaft 703a or 703b around the z-axes 701a, 701b causes the flat plates 102b, 102c to rotate around the z-axes 701a, 701b without affecting the x-axes 702a, 702b.

Conversely, the flat plates 102b, 102c around the x-axis 702a or 702b without affecting the rotation of the support shafts 703a, 703b so that the flat plates 102b, 102c do not rotate around the z-axis. The driving device for the support frames 704b, 704c, support shaft 703a, 703b can be performed with a driving device such as the one shown in FIG. 24 (c) on the side surface of each of the components. Only one such driving device needs to be provided for each set of support shafts 703 or support frames 704.

When the support frame 704b is rotated clockwise around the x-axis 702a, the spacers 700a, 700b move linearly in the direction of the arrow in FIG. 29 while the spacers 700c, 700d in the opposite direction, and the rotational torque is transmitted to the support frame 704c which rotates around the x-axis 702b. If the radius of rotation is equal to the length of the frame in both support frames 704b and 704c, the spacers 700a, 700b move parallel with the spacers 700c, 700d.

Therefore, the support frame 704b rotates around the x-axis 702a, the flat plates 102b, 102c tilt with respect to the flat plate 102a while maintaining the parallelism.

Similarly, when the support shaft 703a rotates around the z-axis 701a, the support frame 704b rotates around the z-axis 701a. The ends of the spacers 700a, 700b, 700c and 700d are able to rotate freely around the frame, as shown in FIG. 30, the rotation of the support frame 704b is transmitted to the support frame 704c, the frame 704b rotates around the z-axis 701b. The flat plates 102b, 102c biaxially tilt with respect to the flat plate 102a while maintaining their parallelism. By this arrangement, it is possible to produce an optical axis displacement in both the x- and z-axis directions.

In this embodiment, the tilting in the θx- and θz-axis directions is not produced, but such effect can be produced by using a driving device such as the one shown in FIG. 25.

Embodiment 23

FIG. 32 is a schematic side view of twenty-third embodiment of the optical axis displacement device, and FIG. 33 is a cross sectional view of a plane at 33a—33a in FIG. 32. This embodiment relates to two optical elements 800a, comprising flat plates 102a, 102b and an optical element 800b comprising a flat plate 102c, 102d, disposed with an intervening air gap (first optical medium) between the two optical elements 800a, 800b. The flat plates 102b, 102c can be moved while maintaining their parallelism independently of the other flat plates 102a, 102d.

The optical element 800a has the features described below added to the optical element 100a in the fifth embodiment. A support frame 801 holds the flat plate 102a disposed at right angles to the optical axis; a support frame 802 holds the flat plate 102b, and is fixed to a support peg 804, and is freely rotatable with a driving arm 803 around the x-axis; an outer frame 806 freely rotatably supports the support peg 804 around the x-axis; a support peg 807 fixed to the axis of the outer frame 806 at right angles to the support peg 804; and a driving arm 808 rotates the outer frame 806, fixed to the support peg 807, around the z-axis.

The optical element 800b comprises the same components as in the optical element 800a above, in which the flat plate 102c is disposed parallel to the flat plate 102b. The reference numeral 809 refer to a support frame holding the flat plate 102d; 810 is another support frame holding the flat plate 102c and is rotated by the driving arm 811 disposed on the support shaft 812 around the x-axis; 814 is an outer frame freely rotatably supporting the support shaft 812 around the x-axis; 815 is a peg fixed to the outer frame 814 at right angles to the support shaft 812; and 816 is a driving arm which rotates the outer frame 814 fixed to the peg 815 around the z-axis.

The optical element 800a is rotated around the x-axis by means of the driving arm 803 about the support shaft 804, for example, thereby tilting the flat plate 102b around the x-axis with respect to the optical axis. By rotating the outer frame 806 with respect to the z-axis by means of the driving arm 808, for example, the flat plate 102b around the z-axis about the peg 807, the flat plate 102b tilts with respect to the optical axis. The optical element 800b operates in the identical way as the optical element 800a. Therefore, the flat plates 102b, 102c may be tilted biaxially around the x-axis and around the z-axis.

In this optical axis displacement device, if a force f shown by the arrow is applied, as shown in FIG. 34 for example, to the driving arms 803, 811, the flat plates 102b, 102c rotates around the x-axis counter-clockwise, and tilts with respect to the optical axis. The force f can be generated by a stepping motor driving a worm gear, as an example. In this example, the flat plates 102b, 102c can be tilted in the same direction by rotating the stepping motor in the same direction. Therefore, an incident ray entering the flat plate 102a at right angles will exit the flat plate 102d displaced from but parallel to the optical axis.

If the force f acting in the arrow direction is applied to only one of the driving arms 803, 811, one of the flat plates 102b, 102c under load rotates around the x-axis counterclockwise, and tilts with respect to the optical axis. Therefore, the incident ray entering at right angles to the flat plate 102a exit from the flat plate 102d refracted in the θx direction.

Further, if the force f is applied to only one of the driving arms 808, 816, one of the flat plates 102b, 102c under load rotates around the z-axis clockwise, and tilts with respect to the optical axis. Therefore, the incident ray entering at right angles to the flat plate 102a exit from the flat plate 102d refracted in the θz direction.

The above arrangement is thus able to displace the optical axis of the exit ray parallel to the incident ray entering the flat plate 102a at right angles, and also refract the incident ray in one of either the θx- or θz axis direction.

Further, it should be noted that in this embodiment, the axes of the flat plates 102a to 102d were chosen to be near the transparent liquid 103, it is not necessary to restrict to such an arrangement, and other configuration is possible.

Embodiment 24

FIG. 35 is a schematic side view of twenty-fourth embodiment of the optical axis displacement device. Two optical elements 820a, 820b are disposed on an optical axis with an intervening air gap. The flat plates 102a, 102d are able to move separately while maintaining their parallelism.

The optical element 820a is a variation of the optical elements presented in embodiment 23 by disposing a retaining frame 802 to the flat plate 102a, and a retaining frame 801 to the flat plate 102b. The flat plate 102a is rotated around the x- and the z-axes to tilt the flat plate 102a with respect to the optical axis. The optical element 820b has the same construction as the optical element 820a.

The optical element 820a is rotated on the peg 804 around the x-axis, for example, by means of the driving arm 803, thereby tilting the flat plate 102a around the x-axis with respect to the optical axis. By rotating the outer frame 806 about a peg 807 with respect to the z-axis by means of the driving arm 808, for example, the flat plate 102a around the z-axis, the flat plate 102a tilts with respect to the optical axis. The optical element 820b operates in the identical way as the optical element 820a. Therefore, the flat plates 102a, 102d may be tilted biaxially around the x-axis and around the z-axis.

In this optical axis displacement device, if a force f shown by the arrow is applied, for example, to the driving arms 803, 811, the flat plates 102a, 102d rotates around the x-axis clockwise as shown in FIG. 36, and tilts with respect to the optical axis. The flat plates 102a, 102d can be tilted through the same angle to the optical axis. Therefore, an incident ray entering the flat plate 102a at right angles will exit the flat plate 102d displaced from but parallel to the optical axis.

If the force f acting in the arrow direction is applied to only one of the driving arms 803, 811, the incident ray refracts in the θx direction, and if the force acts on either of the 808 or 816, the incident ray refracts in the θz direction.

The above arrangement is thus able to shift the optical axis of the exit ray parallel to the incident ray entering the flat plate 102a at right angles, and also refract the incident ray in one of either the θx- or θz axis direction.

Embodiment 25

Figure 37:
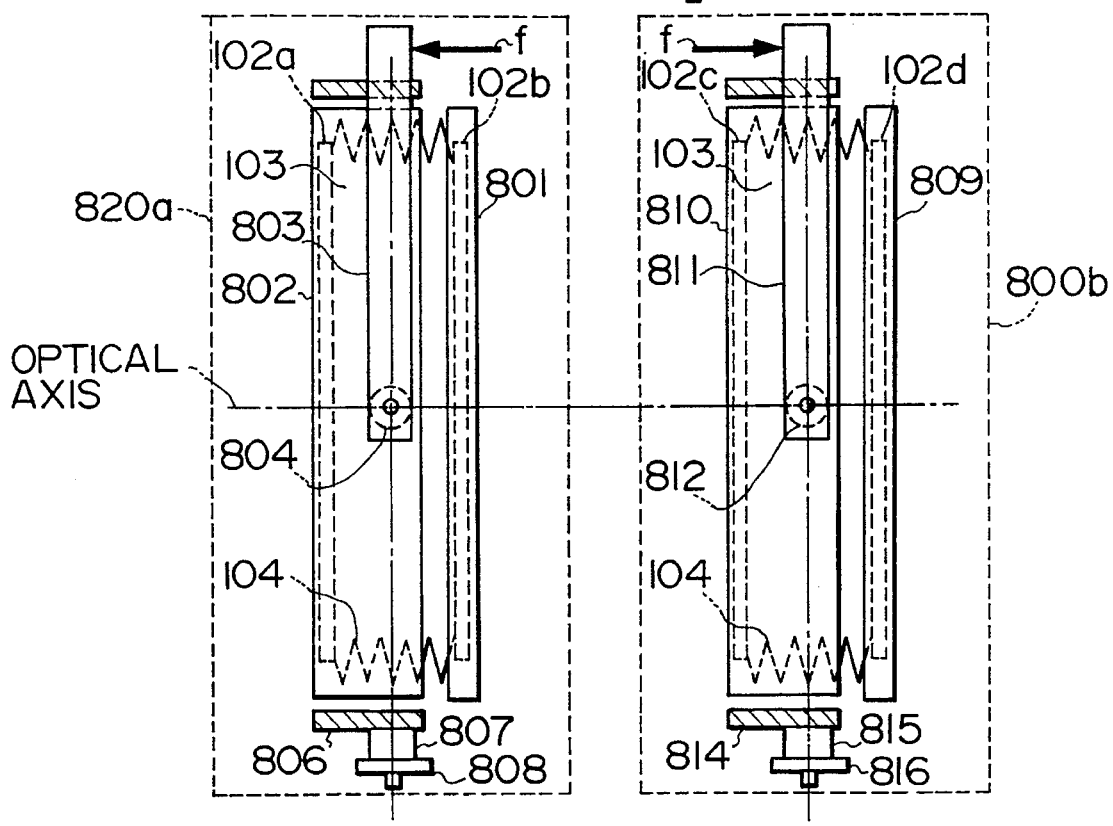
FIG. 37 is a schematic side view to illustrate the optical axis displacement device of the twenty-fifth embodiment of the present invention.

FIG. 37 is a schematic side view of a twenty-fifth embodiment of the optical axis displacement device. The above described optical elements 820a, 800b are disposed on an optical axis with an intervening air gap, and the flat plates on the ray entry side of the respective optical elements 820a, 800b are arranged so that they may be tilted through the same angle but in the opposite directions.

In these optical elements, if the driving arms 803, 811 are driven in the opposite directions by a force f in the arrow direction shown in FIG. 37, then the flat plate 102a rotates counter-clockwise around the x-axis, and the flat plate 102c rotates around the x-axis clockwise, as shown in FIG. 38.

Suppose that the rotation angle is small so that an approximation sin θ≈θ holds, when the flat plates 102a, 102c are each tilted by an angle θ in the opposite directions, an incident ray entering the flat plate 102a parallel to the optical axis, refracts at an angle θ2 (=θ1/n), and refracts further upon exiting the flat plate 102b an angle θ3 (=n(θ1−θ2)). This ray enters the flat plate 102c at an angle θ1+θ3, and refracts at an angle θ4=((θ1+θ3)/n). Thus θ4=θ1, and the exit ray from the flat plate 102 d becomes parallel to the incident ray, but is displace from the optical axis in accordance with the angle θ1.

Further, if the force f is applied to only one of the driving arms 803, 811, the incident ray refracts in the θx direction, and if the force is applied to only one of the arms 808, 816, then the incident ray refracts in the θz direction.

The above arrangement thus enables the incident ray entering the flat plate 102a to be displaced parallel to the optical axis, and refracted in the θx- or θz direction.

Embodiment 26

Figure 39:
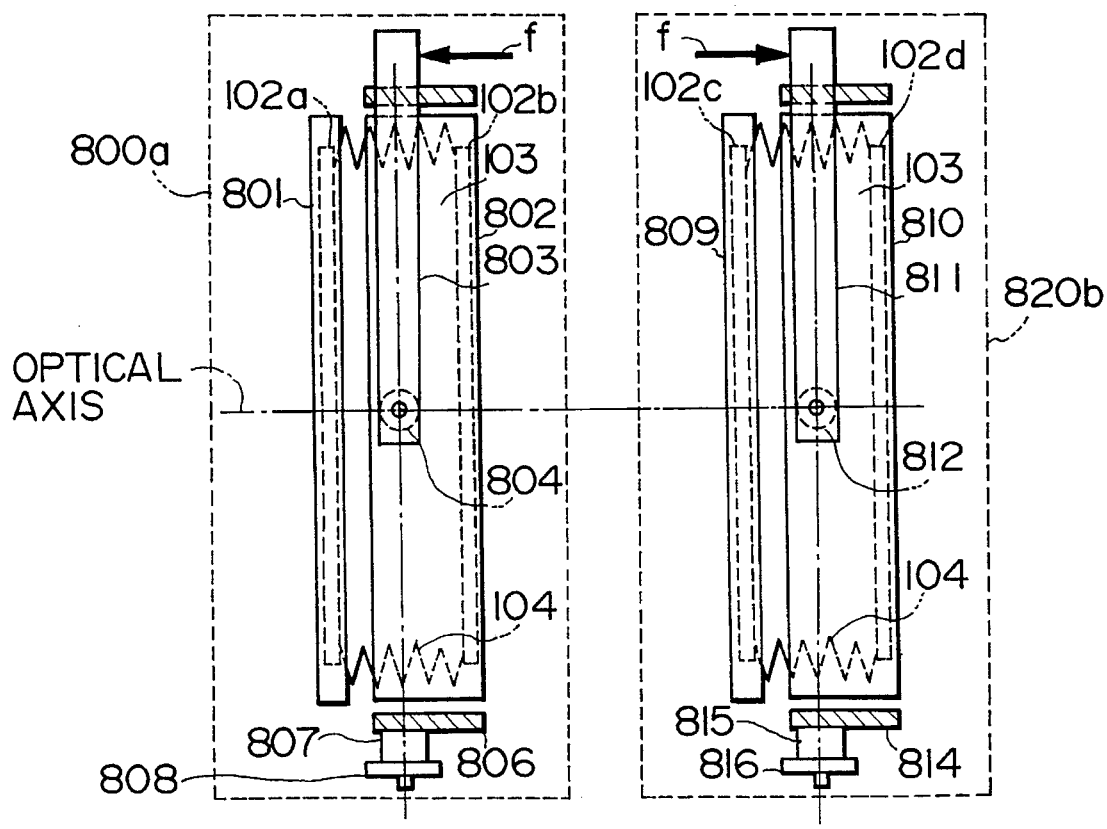
FIG. 39 is a schematic side view to illustrate the optical axis displacement device of the twenty-sixth embodiment of the present invention.

FIG. 39 is a schematic side view of a twenty-sixth embodiment of the optical axis displacement device. The above described optical elements 800a, 820b are disposed on an optical axis with an intervening air gap, and the flat plates on the ray entry side of the respective optical elements 800a, 820b are arranged so that they may be tilted by through same angle but in the opposite directions.

The construction and the operation of the optical elements, as shown in FIGS. 39 and 40, are the arrangement of embodiment 25 with the incident side and the exit being reversed, the action of the ray is the same as in embodiment 25, and the explanation is omitted.

The arrangement of embodiment 26 also enables the incident ray to be displaced from the optical axis upon exiting, and refracted in the θx and θz directions.

Embodiment 27

FIG. 41 is a schematic side view of a twenty-seventh embodiment of the optical displacement device. Two optical elements 830a, 830b, are disposed on an optical axis with an intervening air gap, and the opposed inner flat plates 102b, 102c and the opposed outer flat plates 102a, 102d can be moved separately while maintaining the parallelism of the paired opposed flat plates.

In this embodiment, the support frame 801 and the outer frame 806 for the optical element 800a of embodiment 23 are made into one frame 831, thereby enabling to tilt the flat plate 102b with respect to the optical axis by rotating it around the x-axis, and tilting the flat plate 102a around the z-axis. In the optical element 830b, the frames 809 and 814 are made into a frame 832.

In this optical element 830a, by rotating the frame 802 on the support frame 804, by the driving arm 803 for example, around the x-axis, the flat plates 102b can be rotated around the x-axis, and is tilted with respect to the optical axis. Also the frame 831 can be rotated on the peg 807 around the z-axis, the flat plate 102a can be tilted with respect to the optical axis. The optical element 830b behaves in the same way. Therefore, each of the flat plates 102a, 102d rotates around the z-axis, and the flat plates 102b, 102c rotates around the x-axis.

When a force f is applied to the driving arms 803, 811, the flat plates 102b, 102c rotates around the x-axis counter-clockwise, and tilts with respect to the optical axis. By rotating the stepping motor, for example, in the same direction, to drive the driving arms 803, 811, the flat plates 102b, 102c can be tilted by the same angle with respect to the optical axis. Therefore, an incident ray entering parallel to the optical axis is displaced in the z-axis direction upon exiting the flat plate 102d.

When the force f is applied to the driving arms 808, 816, the flat plates 102a, 102d rotates around the z-axis, the incident ray entering parallel to the optical axis is displaced in the x-axis direction and displaced parallel to the optical axis upon exiting the flat plate 102d.

If the force is applied to either one of the driving arms 803 or 811, the incident ray is refracted in the θx direction, and if the force is applied to one of the driving arms 808, 816, the incident ray is refracted in the θz direction.

The above arrangement enables the incident ray to be displaced parallel with respect to the optical axis, and to be refracted in the θx or θz direction.

Embodiment 28

Figure 42:
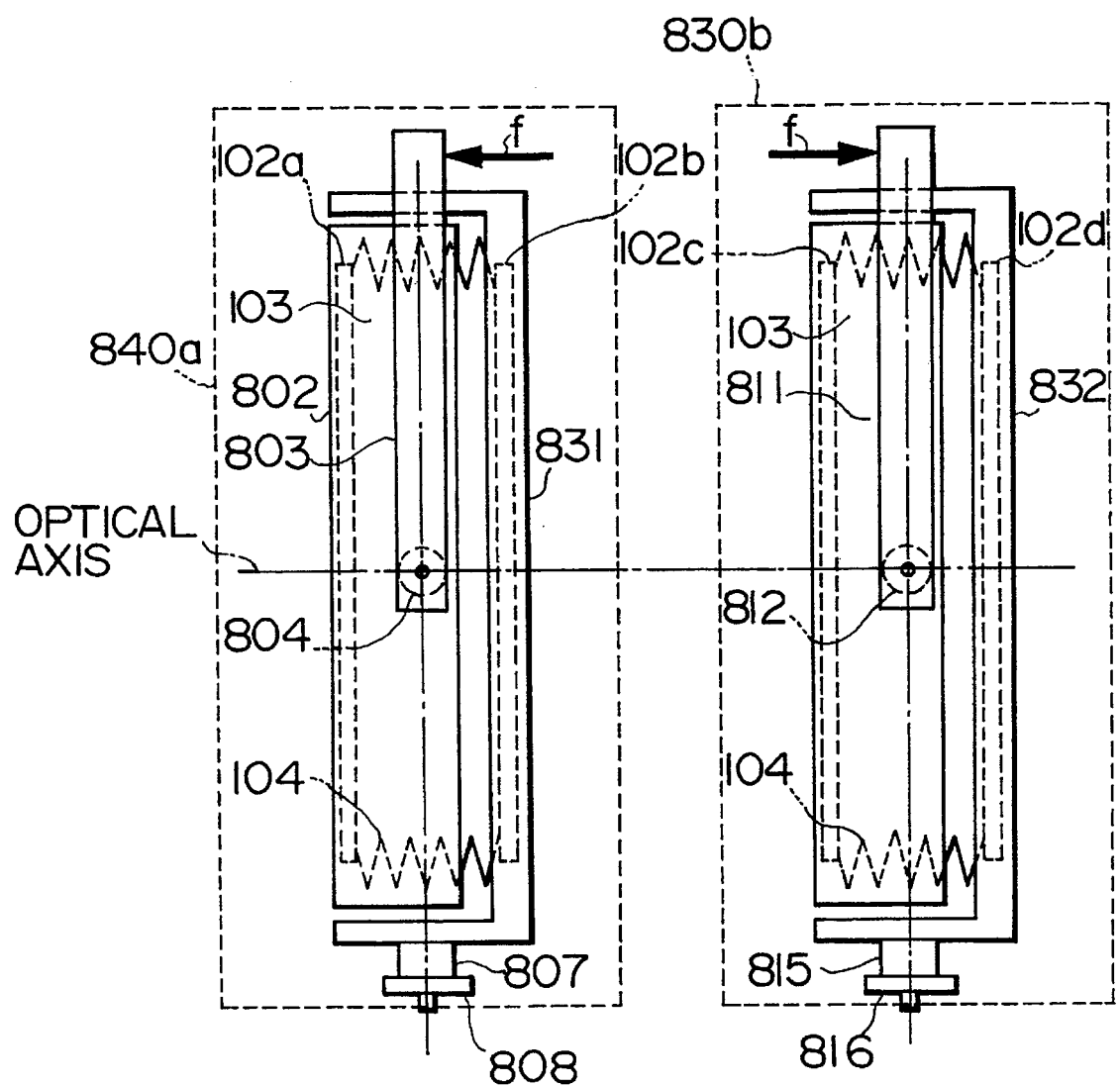
FIG. 42 is a schematic side view to illustrate the optical axis displacement device of the twenty-eighth embodiment of the present invention.

FIG. 42 is a schematic side view of the optical axis displacement device. Two optical elements 840a, 830b are disposed on an optical axis with an intervening air gap, and the flat plates on the entry side 102a, 102c and the flat plates 102b, 102d on the exit side can be moved separately through the same angle but in the opposite directions.

In this embodiment, the support frame 801 and the outer frame 806 for the optical element 820a of embodiment 24 are made into one frame 831, thereby enabling to tilt the flat plate 102a with respect to the optical axis by rotating it around the x-axis, and the flat plate 102b is tilted by rotating it around the z-axis.

In this device, the flat plates 102a, 102c tilt by rotating around the x-axis. The flat plates 102b, 102d tilt by rotating around the z-axis. If a force f is applied to the driving arms 803, 811 in opposite directions, shown by the arrows in FIG. 42, the flat plate 102a rotates counter-clockwise around the x-axis and tilts as shown in FIG. 38 with respect to the optical axis. The flat plate 102c rotates around the x-axis clockwise the tilts with respect to the optical axis. For small angles in which an approximation Sin θ≈θ is valid, as in embodiment 25, when the flat plates 102a, 102c are titled in the opposite directions by the same angle, an incident ray entering the flat plate 102a parallel to the optical axis is displaced in the z-axis direction and displaced parallel to the optical axis upon exiting from the flat plate 102d. Similarly, when the flat plates 102b, 102d are moved oppositely by the same angle, the incident ray is shifted in the x-axis direction, and is displaced parallel to the optical axis.

Further, if the force is applied to one of the driving arms 803, 811, the incident ray refracts in the θx-axis direction, and if the force is applied to one of the driving arms 808, 816, the incident ray is refracted in the θz-direction.

The above arrangement enables the incident ray entering the flat plate 102a to be shifted parallel to the optical axis and refracted in the θx or θz direction.

Embodiment 29

Figure 43:
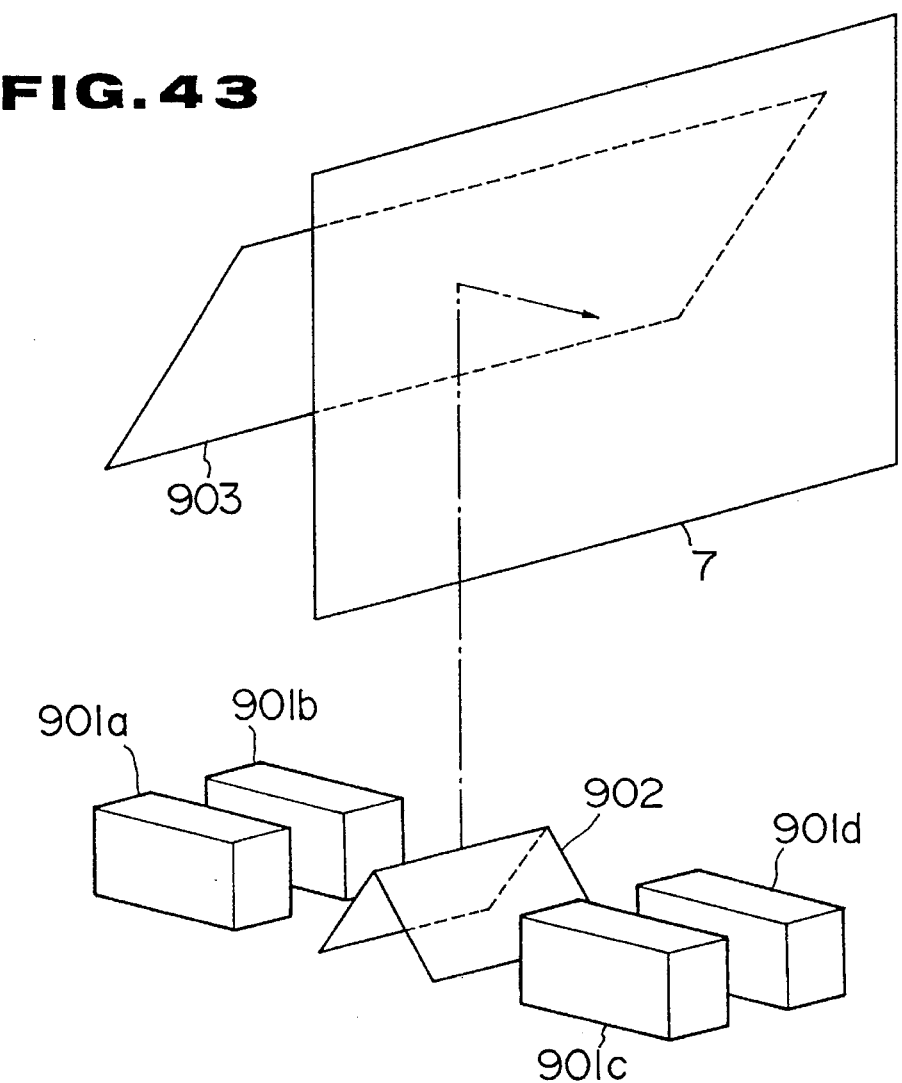
FIG. 43 is an illustration of a twenty-ninth embodiment of the projection apparatus using the optical axis displacement device of the present invention.

FIG. 43 is a schematic illustration of a twenty-ninth embodiment showing a projection display apparatus using an optical axis displacement device of the present invention. In this figure, 901a–901d represent projectors having a projection lens system, 902 is a roof-shaped total reflection mirror, 903 is a total reflection mirror, and 7 is a screen for the projectors 901a–901d.

Figure 50:
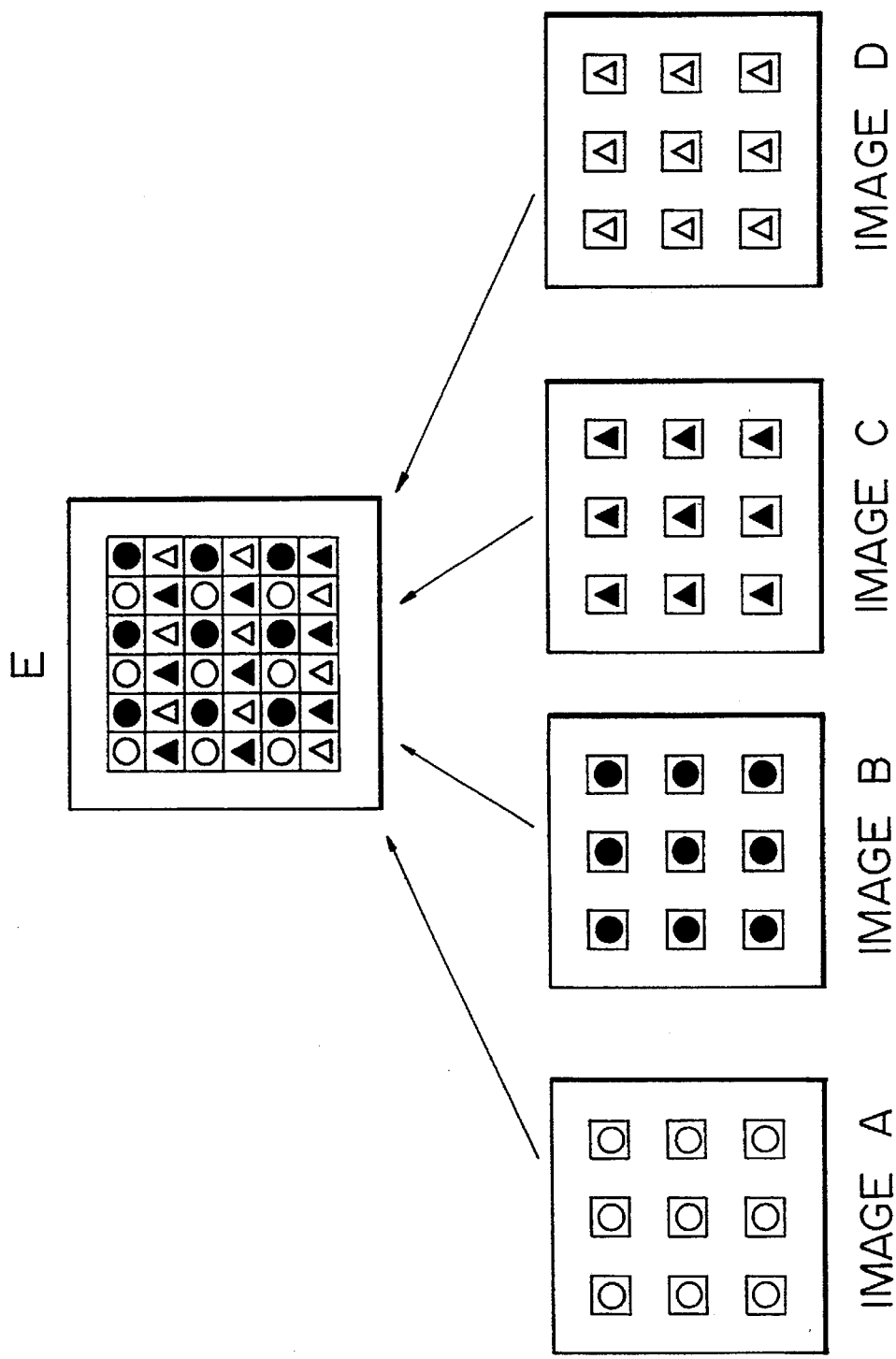
FIG. 50 is a schematic drawing to illustrate the principle of interleave projection to produce a composite image from four dissimilar component images.

The projection ray emitted from the projector 901a–901d is reflected upwards from the roof-shaped total reflection mirror 902, and is again reflected by the total reflection mirror 903, and an enlarged image is projected on the screen 7. As explained in reference to FIG. 50, a composite image is generated by displacing the images from each of the projectors 901a–901d by half a pixel, and interleaving the displaced images. Therefore, the composite image provides a resolution which is effectively twice that of the resolution capability of each of the projectors 901a–901d.

In this projection device, half a pixel displacement in each of the four projectors 901a–901d demands that the light valves must be eccentric with respect to the optical axes of the projectors.

Figure 44:
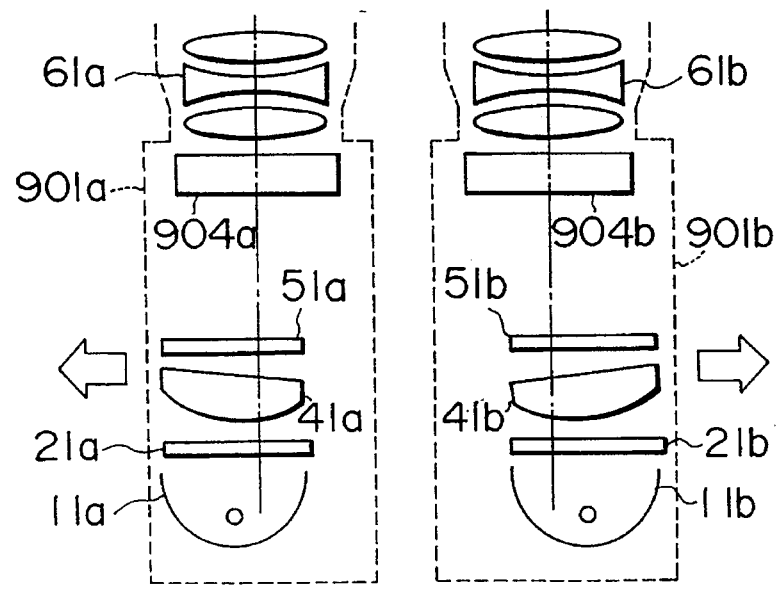
FIG. 44 is a schematic representation showing the projector section of the twenty-ninth embodiment which uses the optical axis displacement device of the present invention.
Figure 45:
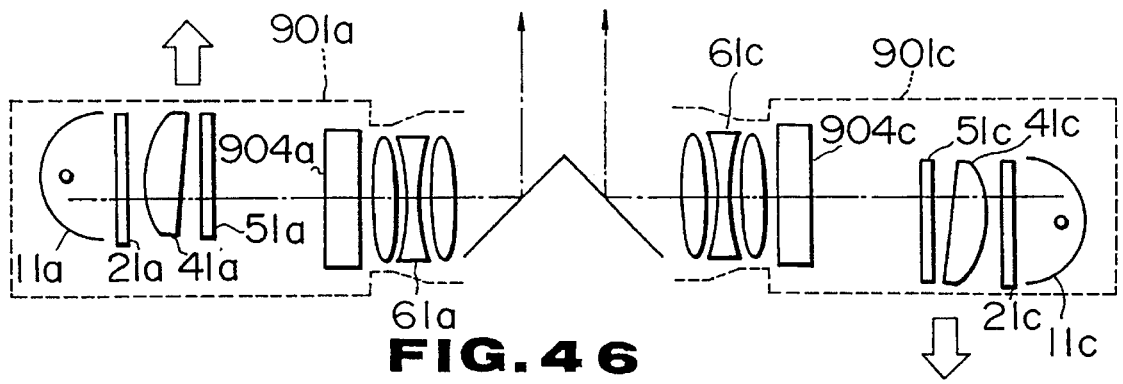
FIG. 45 is a schematic representation showing the projector section of the twenty-ninth embodiment which uses the optical axis displacement device of the present invention.

FIGS. 44 and 45 show schematic details of the neighboring projectors 901a, 901b and the opposing projectors 901a and 901c, respectively. They share identical components as follows: light sources 11a–11c; IR and UV filters 21a–21c for the light sources 11a–11c; condensor lenses 41a–41c; light valves 51a–51c; projection lenses 61a–61c and light ray shift elements 904a–904c.

In FIG. 44, the eccentricity of the light valves 51a, 51b of the neighboring projectors 901a, 901b, and in FIG. 45, the eccentricity of the light valves 51a,51c of the opposing projectors 901a, 901c with an interposed roof-shaped total reflection mirror 902. FIG. 44 illustrates that the eccentricities of the neighboring projectors 901a, 901b and 901c, 901d are, respectively, generated horizontally in the opposite directions in accordance with the distance between the projectors. For the opposing projectors 901a, 901c (and 901b, 901d), the light rays of the projection lenses 61a, 61c (and 61b, 61d) are respectively reflected upwards by the roof-shaped reflectors 902, and are again reflected by the total reflection mirror 903, leading to the final vertical eccentricity on the screen 7. Therefore, the required eccentricity for the light valves 51a, 51c is in the vertical opposite directions.

In this embodiment, because the light ray shift elements 904a, 904b are disposed between the light valves 51a, 51b and the projection lenses 61a, 61b, as explained in the embodiments above, the projection image of the light valves 51a, 51b are moved on the screen 7. For example, if the optical axis displacement element of embodiment 27 is used, the projection image can be moved biaxially in the x- and the z-axis directions, as well as tilt the image in the θx- and θz-axes directions. It will be clear that the amount of shift on the screen 7 caused by the light ray shift elements 904a, 904b is proportional to the magnifying ratio of the projection lenses 61a, 61b.

Embodiment 30

Figure 46:
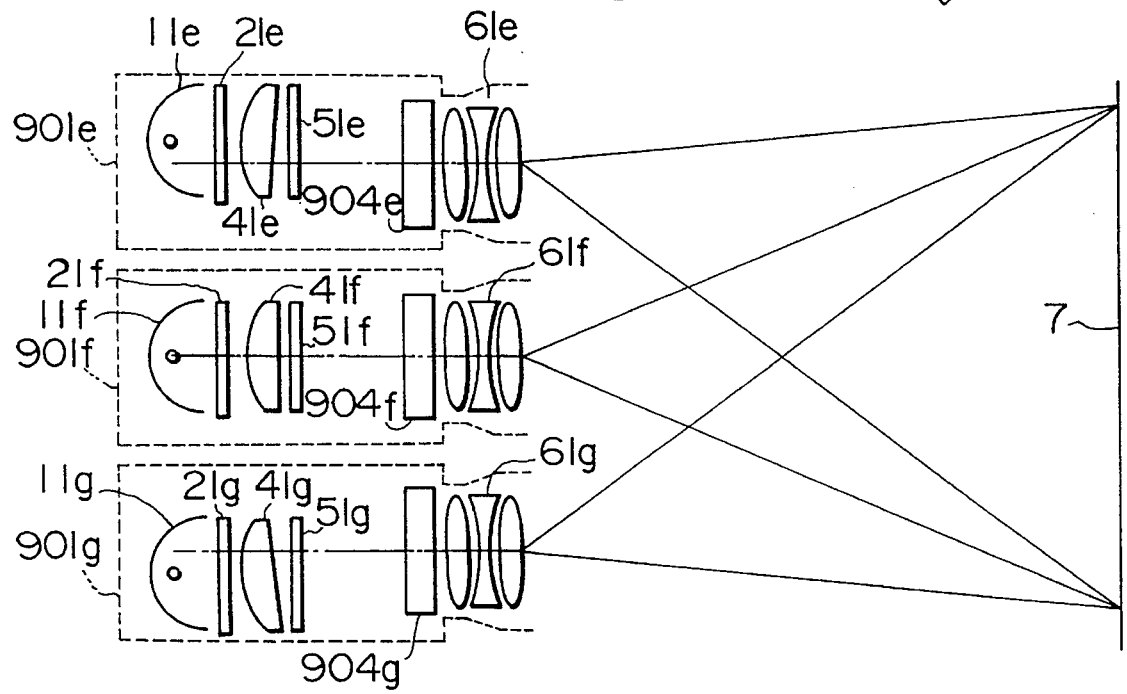
FIG. 46 is a schematic representation of the projection display apparatus of the thirtieth embodiment which uses the optical axis displacement device of the present invention.

FIG. 46 is another embodiment of the projection display apparatus using the light ray shift elements of the present invention. In this figure, 901e–901g refer to projectors which projects red, green and blue components, respectively, to produce a full color image on the screen 7. In this projection display apparatus, the optical centers of the light valves 51e, 51g for the projectors 901e, 901g can be made eccentric by the same principle illustrated in embodiment 29, and are displaced horizontally in opposite directions away from each other with respect to each projection lens system 61e, 61g.

In this example, 901e–901g are projectors, respectively, for the red, green and blue components of a projection image, which produce a full color composite image on the screen 7. In this embodiment, the light ray shift elements 904e–904g are disposed between the light valves 51e–51g and the projectors lenses 61e–61g, as explained in the preceding embodiment 29, the images on the light valves 51e–51g are moved on the screen 7. For example, if the optical axis displacement device of embodiment 27 is used, the projected image can be positioned in the x-, z-, θx-, θz-axes directions.

Embodiment 31

Figure 47:
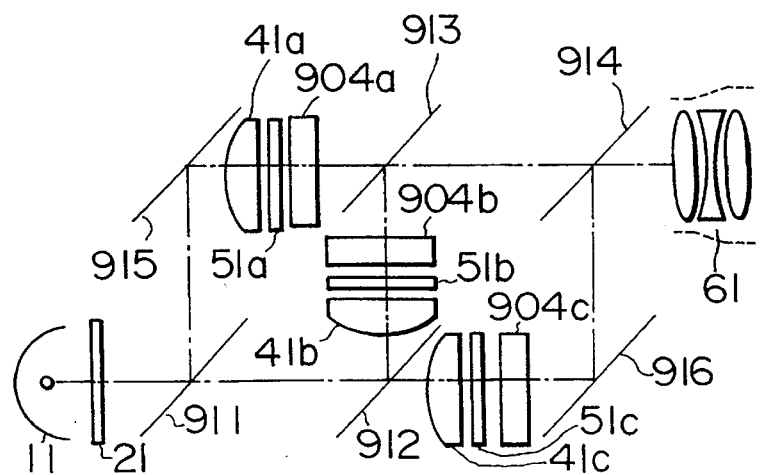
FIG. 47 is a schematic representation of the projection display apparatus of the thirty-first embodiment which uses the optical axis displacement device of the present invention.
Figure 48:
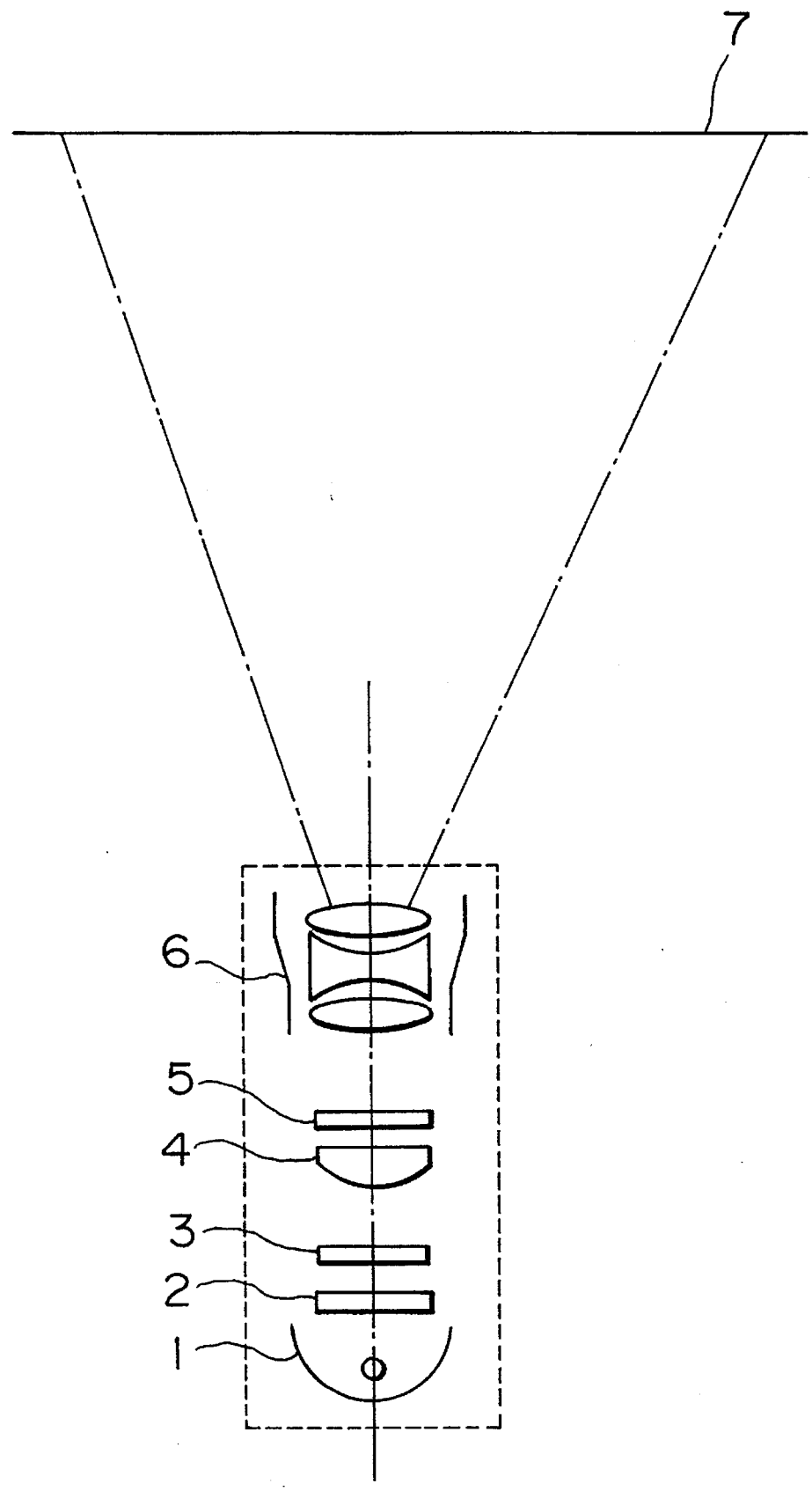
FIG. 48 is a schematic representation of the conventional projection display apparatus.

FIG. 47 is another embodiment of the projection display apparatus using the light ray shift elements of the present invention. In this figure, 911–914 are dichroic mirror, 915, 916 are surface reflecting mirror.

The projection display device functions by using dichroic mirrors 911, 912 to divide the white light from the light source 10 into red, green and blue components, which propagate to the respective light valves 51a–51c, and the exit rays therefrom are synthesized by the dichroic mirrors 913, 914 into red, green and blue colors to be enlarged and projected by the lens system 61. The action of this projection display apparatus will be explained further.

The red component of the white light emitted from the light source 10 is reflected by the dichroic mirror 911, which is again reflected by the surface mirror 915, and enters the light valve 51a. Also, the green component of the blue-green component of the white light transmitted through the dichroic mirror 911 is reflected by the dichroic mirror 912 and enters the light valve 51b. The blue component passing through the dichroic mirror 912 enters the light valve 51c. In the light valves 51a–51c, the image in the respective monochrome is displayed.

The exit red ray from the light valve 51a, after being adjusted for the predetermined optical axis by the light ray shift element 904a, passes through the dichroic mirror 913. The green component exiting the light valve 51b, after being adjusted to the predetermined optical axis by the light ray shift element 904b, is reflected by the dichroic mirror 913 and is synthesized with the red light from the light valve 51a. Further, the blue component exiting the light valve 51c, after being adjusted by the light ray shift element 904c to the predetermined optical axis, totally reflected by the surface mirror 916, again reflected by the dichroic mirror 914, and is synthesized with the synthesized light from the dichroic mirror 913, and is enlarged and projected by the lens system 61.

In this case, because the light ray shift elements 904a–904c are disposed between the respective light valves 51a–51c and the projection lens system 61, as explained in the preceding embodiment 29, the images on the light valves 51a–51c are positioned on the screen 7 with respect to the four axes in the x-, z-, θx- and θz-axes direction.

According to the projection display devices presented above, transparent flat plates can be disposed between the projection lens and the light valve or in front of the projection, and by varying the orientation of the surface of the flat plates with respect to the projection lens axis, the ray path can be changes in four axes of the six axes with the use of the flat plates only. The present invention offers simplicity of image quality adjustments which were not available in the conventional system. The present invention is further useful in practice since the flat plates are compact and light weight, thereby offering an advantage that the adjusting stage can also be made compact and light weight.

Furthermore, the driving systems for moving the optical components in the projection display system can also be made compact and light weight.

When the image quality adjustment devices of the present invention are used in a multi-projector system, a high quality image on a wide vision screen can be obtained readily by enabling to provide high precision image adjustments easily and quickly.

What is claimed is:

1. An optical axis displacement device comprising first and second optical elements, said first and second optical elements including:

a plurality of transparent flat plates disposed at a predetermined spacing along an optical axis of an incident ray passing through a first optical medium, such that an orientation with respect to said optical axis of an incident ray surface of each of said transparent flat plates is freely adjustable, a first one of said plurality of said transparent flat plates is a ray entry plate having one of said incident ray surfaces and an exit ray surface, and a second one of said plurality of transparent flat plates is a ray exit plate disposed opposite to said ray entry plate and having a second one of said incident ray surfaces and an exit ray surface;

a freely extendable bulkhead enclosing said plurality of transparent flat plates so as to provide a hermetic space between said transparent flat plates; and a second optical medium, of an index of refraction different from said first optical medium, filling said hermetic space, wherein a direction of propagation of an incident ray is altered by disposing said first and second optical elements on an optical axis so that a ray exit surface of a ray exit plate of said first optical element is adjacent to a ray incident surface of a ray entry plate of said second optical element, said ray exit plate of said first optical element and said ray entry plate of said first optical element are operatively connected to each other with a driving device so as to enable adjustment of an orientation angle of said ray incident surface of said ray entry plate of said second optical element and a ray incident surface of said ray exit plate of said first optical element, while keeping said ray exit plate of said first optical element and said ray entry plate of said second optical element in parallel.

2. An optical axis displacement device as claimed in claim 1, wherein said driving device comprises:

a plurality of driving devices so as to provide biaxial adjustments of the orientation of said ray incident surface of said ray entry plate of said second optical element and a ray incident surface of said ray exit plate of said first optical element in mutually orthogonal directions to said optical axis while maintaining said ray exit plate of said first optical element and said ray entry plate of said second optical element substantially parallel.

3. An optical axis displacement device comprising first and second optical elements, said first and second optical elements including:

a plurality of transparent flat plates disposed at a predetermined spacing along an optical axis of an incident ray passing through a first optical medium, such that an orientation with respect to said optical axis of an incident ray surface of each of said transparent flat plates is freely adjustable, a first one of said plurality of said transparent flat plates is a ray entry plate having one of said incident ray surfaces and an exit ray surface, and a second one of said plurality of transparent flat plates is a ray exit plate disposed opposite to said ray entry plate and having a second one of said incident ray surfaces and an exit ray surface;

a freely extendable bulkhead enclosing said plurality of transparent flat plates so as to provide a hermetic space between said transparent flat plates; and a second optical medium filling said hermetic space and of an index of refraction different from said first optical medium, wherein a direction of propagation of an incident ray is altered by disposing said first and second optical elements on an optical axis so that a ray exit surface of a ray exit plate of said first optical element is adjacent to a ray incident surface of a ray entry plate of said second optical element, said ray exit plate of said first optical element and said ray entry plate of said first optical element are respectively provided in first and second holding frames, said first and second holding frames are operatively coupled to a driving device for adjusting an orientation angle of each of said first and second holding frames relative to said optical axis while maintaining said ray entry plate of said second optical element and said ray exit plate of said first optical element in parallel.

4. An optical axis displacement device comprising first and second optical elements, said first and second optical elements including:

a plurality of transparent flat plates disposed at a predetermined spacing along an optical axis of an incident ray passing through a first optical medium such that an orientation with respect to said optical axis of an incident ray surface of each of said transparent flat plates is freely adjustable, a first one of said plurality of said transparent flat plates is a ray entry plate having an incident ray surfaces and a first exit ray surface, and a second one of said plurality of transparent flat plates is a ray exit plate disposed opposite to said ray entry plate and having an incident ray surfaces and a second exit ray surface;

a freely extendable bulkhead enclosing said plurality of transparent flat plates so as to provide a hermetic space between said transparent flat plates; and a second optical medium filling said hermetic space and of an index of refraction different than said first optical medium, wherein a direction of propagation of an incident ray is altered by disposing said first and second optical elements on an optical axis so that a ray exit surface of a ray exit plate of said first optical element is adjacent to a ray incident surface of a ray entry plate of said second optical element, wherein a holding frame is provided for each of the transparent flat plates in each optical element, wherein adjacent ones of said holding frames are operatively connected to a driving device, and spaced apart ones of said holding frames are operatively connected to another driving device, wherein an orientation of said adjacent ones of said holding frames is adjustable with respect to said optical axis while maintaining said adjacent ones of said holding frames in parallel, and an orientation of said spaced apart ones of said holding frames is adjustable with respect to said optical axis while maintaining said spaced apart ones of said holding frames in parallel.

5. An optical axis displacement device comprising first and second optical elements, said first and second optical elements including:

a plurality of transparent flat plates disposed at a predetermined spacing along an optical axis of an incident ray passing through a first optical medium, such that an orientation with respect to said optical axis of an incident ray surface of each of said transparent flat plates is freely adjustable, a first one of said plurality of said transparent flat plates is a ray entry plate having one of said incident ray surfaces and an exit ray surface, and a second one of said plurality of transparent flat plates is a ray exit plate disposed opposite to said ray entry plate and having a second one of said incident ray surfaces and an exit ray surface;

a freely extendable bulkhead enclosing said plurality of transparent flat plates so as to provide a hermetic space between said transparent flat plates; and a second optical medium filling said hermetic space and of an index of refraction different from said first optical medium, wherein a direction of propagation of an incident ray is altered by disposing said first and second optical elements on an optical axis so that a ray exit surface of a ray exit plate of said first optical element is adjacent to a ray incident surface of a ray entry plate of said second optical element, said ray exit plate of said first optical element and said ray entry plate of said first optical element are, wherein a holding frame is provided for each of said plurality of transparent flat plates in each optical element, wherein first selected ones of said holding frames are coupled to said ray entry plates of said first optical element and said second optical element and are operatively connected to a first driving device to tilt said first selected ones of said holding frames by a first angle but in opposite directions while maintaining said first selected ones of said holding frames in parallel, and second selected ones of said holding frames are coupled to said ray exit plates of said first and second optical elements and are operatively connected to another driving device to tilt said second selected ones of said holding frames by a second angle but in opposite directions with respect to said optical axis while maintaining said second selected ones of said holding frames in parallel.

* * * * *

UNITED STATES PATENT AND TRADEMARK OFFICE
CERTIFICATE OF CORRECTION

PATENT NO. : 5,583,694
DATED : December 10, 1996
INVENTOR(S) : Yukio TAKAHASHI et al.

It is certified that error appears in the above-identified patent and that said Letters Patent is hereby corrected as shown below:

Claim 5, column 28, lines 6-7, delete "said ray exit plate of said first optical element and said ray entry plate of said first optical element are,";

line 12, "plates" should read --plate--, and "said second" should read --said ray exit plate of said second--;

line 15, delete "but in opposite directions";

line 18, "plates" should read --plate--, delete "and second";

line 19, "elements" should read --element--;

line 21, "in opposite directions" should read --in an opposite direction--;

lines 22-23, delete "optical axis while maintaining said second selected ones of said holding frames in parallel." and insert therefor --first angle.--.

Signed and Sealed this

Twenty-sixth Day of May, 1998

Attest:

BRUCE LEHMAN

*Attesting Officer*　　　*Commissioner of Patents and Trademarks*